United States Patent [19]

Megherbi

[11] Patent Number: 5,159,249
[45] Date of Patent: Oct. 27, 1992

[54] METHOD AND APPARATUS FOR CONTROLLING ROBOT MOTION AT AND NEAR SINGULARITIES AND FOR ROBOT MECHANICAL DESIGN

[76] Inventor: Dalila Megherbi, 106 E. Manning St., #1C, Providence, R.I. 02906

[21] Appl. No.: 496,675

[22] Filed: Mar. 21, 1990

Related U.S. Application Data

[63] Continuation-in-part of Ser. No. 352,772, May 16, 1989, abandoned.

[51] Int. Cl.$^5$ ............................................. G05B 19/18
[52] U.S. Cl. ......................... 318/568.1; 318/568.11; 901/8; 901/15; 395/1
[58] Field of Search .................. 318/560–640; 364/513, 167.01, 174, 191, 192; 901/2, 3, 9, 8, 12, 13, 15, 18, 19, 20, 21, 22, 23

[56] References Cited

U.S. PATENT DOCUMENTS

| | | | |
|---|---|---|---|
| 4,362,977 | 12/1982 | Evans et al. | 901/9 X |
| 4,594,671 | 6/1986 | Sugimoto et al. | 364/513 |
| 4,604,716 | 8/1986 | Kato et al. | 318/568.11 |
| 4,680,519 | 7/1987 | Chand et al. | 364/513 X |
| 4,763,276 | 8/1988 | Perreirra et al. | 364/513 |
| 4,794,547 | 12/1988 | Nishida | 901/15 X |
| 4,823,279 | 4/1989 | Perzley et al. | 364/513 |
| 4,853,874 | 8/1989 | Iwamoto et al. | 901/8 X |
| 4,860,215 | 8/1989 | Seraji | 364/513 |

OTHER PUBLICATIONS

V. C. Klema and A. J. Laub, "The Singular Value Decomposition: Its Computation and Some Application", IEEE Transactions on Automatic Control, vol. AC-25, No. 2, Apr. 1980, pp. 164–176.

S. K. Chan and P. D. Lawrence, "General Inverse Kinematics With the Error Damped Pseudoinverse," Proceedings of the 1988 International Conference on Robotics and Automation, pp. 834–839.

P. R. Chang and C. S. G. Lee, "Residue Arithmetic VLSI Array Architecture for Manipulator Pseudo-Inverse Jacobian Computation," Proc. of 1988 IEEE International Conference on Robotics and Automation, vol. 1, pp. 297–302.

J. Y. S. Luh, M. W. Walker and R. P. C. Paul, "Resolved-Acceleration Control of Mechanical Manipulators," IEEE Transactions On Automatic Control, vol. AC-25, No. 3, Jun. 1980, pp. 468–474.

B. Armstrong, O. Khatib, J. Burdick, "The Explicit Dynamic Model and Inertial Parameters of the PUMA 560 Arm," Proceedings of the IEEE International Conference on Robotics and Automation, San Francisco, Calif. Apr., 1986, pp. 510–518.

(List continued on next page.)

*Primary Examiner*—Bernard Roskoski
*Assistant Examiner*—Paul Ip
*Attorney, Agent, or Firm*—Darby & Darby

[57] ABSTRACT

This invention relates to the field of computer controlled robotics. More specifically, it relates to a novel method and algorithm to symbolically decompose the robot jacobian matrix, in such a way that the robot jacobian Moore-Penrose pseudo-inverse is obtained symbolically even when the robot jacobian is ill conditioned or rank deficient, and to a general purpose computer and method to perform the symbolic steps. The resulting symbolic pseudo-inverse, after symbolic reduction techniques, is not only efficient from the point of view of number of floating point operations, but is also accurate (exact) and stable. It removes the restrictions imposed by the computational complexity of the jacobian pseudo-inverse, especially when the robot jacobian is ill conditioned (robot near/at singularities). This method is sufficiently fast to allow real time control of the robot and is sufficiently stable to allow good robot performance near singularities. In addition, the method presented in this invention is of special importance for the future design of prototypes of robot manipulators, as well as for robot trajectory planning.

12 Claims, 26 Drawing Sheets

OTHER PUBLICATIONS

M. B. Leahy, Jr., L. M. Nugent, K. P. Valavanis, and G. N. Saridis, "Efficient Dynamics for a Puma-600," Proceedings of the IEEE International Conference on Robotics and Automation, San Francisco, Calif. Apr. 1986, pp. 519–524.

C. A. Klein and C. Huang, "Review of Pseudoinverse Control for use with Kinematically Redundant Manipulators," IEEE Transactions of Systems, Man, and Cybernetics, Col. SMC-13, No. 3, Mar./Apr. 1983, pp. 245–250.

J. M. Hollerbach and K. C. Suh. "Redundancy Resolution of Manipulators through Torque Optimization," Proc. IEEE International Conference On Robotics and Automation, 1985, pp. 1016–1021.

Y. Nakamura and H. Hanafusa, "Task Priority Based Redundancy Control Of Robot Manipulators," Second International Symposium, eds. H. Hanafusa and H. Inoue, Cambridge, Mass., M.I.T. Press, 1985, pp. 155–162.

J. Denavit and R. S. Hartenberg, "A Kinematic Notation for lower-pair Mechanisms Based on Matrices," Journal of Applied Mechanics, pp. 215–221, Jun. 1955.

M. Vukobratovic and M. Kircanski, "A Dynamic Approach to Nominal Trajectory Synthesis for Redundant Manipulators," IEEE Transactions on Systems, Man, and Cybernetics, Vol. SMC-14, No. 4, Jul./Aug. 1984, pp. 580–586.

A. Leigeois, "Automatic Supervisory Control of the Configuration and Behavior of Multibody Mechanisms," IEEE Transactions on Systems, Man, and Cybernetics, Vol. SMC-7, No. 12, Dec. 1977, pp. 868–871.

A. Fournier and W. Khalil, "Coordination and Reconfiguration of Mechanical Redundant Systems," Proc. of Int'l Conference on Cybernetics and Society, Sep. 19–21, 1977, pp. 227–231.

Circle desired trajectory:
$x_d = 1.34 + 0.66\cos(t)$
$y_d = 1 - 0.66\sin(t)$

METHOD AND APPARATUS FOR CONTROLLING ROBOT MOTION AT AND NEAR SINGULARITIES AND FOR ROBOT MECHANICAL DESIGN

This is a continuation-in-part application based upon my copending application Ser. No. 352,772, filed May 16, 1989 now abandoned.

BACKGROUND OF THE INVENTION

This invention relates to the field of computer controlled robotics. Most existing industrial robot manipulators are serial mechanical structures/devices that resemble the human arm. In FIG. 1 are shown three examples of six-degree-of-freedom robots with spherical wrists, namely the robots conventionally called the Cincinnati T3, the Stanford arm, and the Unimation Puma 560. Robot manipulators are basically an open loop (or closed) chain of links connected to each other through joints, which are controlled by actuators. The generalized coordinates 1 ($\theta_1$, $\theta_2$, $\theta_3$, $\theta_4$, $\theta_5$, $\theta_6$) are called the joint coordinates and form the robot joint space. The end effector Cartesian position/orientation 2 with respect to a Cartesian space coordinate system represents the robot Cartesian space. In most robotic control strategies, the primary task is driving the joint actuators, so that the end effector follows a desired Cartesian position/orientation trajectory. In order to achieve that, a fundamental problem, which must be solved in all sophisticated computer based robot Cartesian controller design, is that robots are usually servoed in the joint space (through the actuator motors), while the robot desired tasks are best described and specified in the Cartesian space.

For instance, consider the task where the robot's end effector has to track a certain Cartesian surface when applying a certain force on it (position and force control), or the task where the robot end effector has to follow a certain Cartesian straight line (position control); we may notice that these tasks are best described in the Cartesian space and not in the joint space. The joints of the robot must move at different joint rates in order to achieve the desired end effector position/orientation Cartesian trajectory. Therefore, the inverse mapping between the Cartesian space and the joint space—i.e., given a desired Cartesian position/orientation of the end effector, then what is the set of joint coordinates that the robot must have, to achieve the desired end effector Cartesian position/orientation—, must be solved in every sophisticated computer-based robot control. This is known as the inverse kinematic problem. It is one of the most difficult problems in robotics.

A systematic and straightforward technique for computing the forward kinematics (i.e., given the joint coordinates, then determine the Cartesian position/orientation of the effector) is described in articles by Denavit and R. Hartenberg, "A kinematic motion for lower-pair mechanisms based on matrices" AME J. Appl. Mech. pp. 215-221, June 1955, and by Pieper, D. I., and B. Roth, "The kinematics of manipulators under computer control", Proc. 2nd Int. Conf. Theory of Machines and Mechanisms, Warsaw, September 1969. The forward kinematics problem is straightforward and simple. The inverse kinematics problem (IKP) is more difficult and a closed form solution is not known (may be impossible) to this day. At one time, for simple robots, the IKP was solved by man using his intuition and experience. Today, when the robots are called to perform sophisticated Cartesian tasks, intuition and experience are not enough to solve the problem. A closed form solution to the IKP exists only for a limited number of robot kinematic designs that allow a closed form solution. The IKP becomes more difficult when the robot is redundant. A robot is redundant when it has more degrees of freedom than necessary. It is well established that in the case of a redundant robot, there is an infinity of solutions to the IKP. The IKP is also even more difficult when the robot is in a singular configuration. A robot singular configuration is a configuration where the robot end effector cannot move in certain Cartesian directions. Robot singularities translate into rank deficiency in the robot jacobian matrix. The robot jacobian is a matrix which forms the linear relation between the differential changes in the Cartesian coordinates and the differential changes in the joint coordinates. This matrix is time varying and depends on the robot different joint configurations.

Many researchers in the field of robotics are still searching for effective procedures to solve the IKP for general architecture robots, in order to permit the implementation of Cartesian-based robot controllers. In the next section, the prior art best known methods of Cartesian-based robot control, as well as prior art inverse kinematic methods, are briefly described. The best prior art known methods to solve the IKP can be classified in two categories:

(1) OPTIMIZATION METHODS BASED ON THE GLOBAL CARTESIAN TRAJECTORY INFORMATION.

The solution of these methods computes a joint trajectory that optimizes certain performance criteria, such as kinetic energy or completion time, while still satisfying a desired Cartesian trajectory. These methods usually produce joint trajectories with good performance. Unfortunately, because of the complexity of the scheme they are based on, they are limited to be off-line methods (as opposed to real time) and do not incorporate real time trajectory correction based on the end effector error measurements. For these reasons, these methods have not seen much use. Among the articles which use these methods, see articles by Fournier, A., and Khalil, W., 1977, "Coordination and reconfiguration of mechanical redundant systems", Proc. Int. Conf. on Cybernetics and Society, pp. 227-231, and by Vukobratovic, M., and Kircanski, M. 1984," A dynamic approach to nominal trajectory synthesis for redundant manipulators, IEEE Trans., Syst., Man., and Cybernetics SMC 14 pp. 580-586.

(2) METHODS BASED ON LOCAL CARTESIAN TRAJECTORY INFORMATION.

These methods are basically based on the inversion of the robot jacobian using the Moore-Penrose pseudo-inverse. These methods are the most widely used because they incorporate the robot end effector error measurements, and therefore are suitable for real time control in a changing environment. Real time control based on sensory feedback is required in many robot tasks and this is the major reason why these methods are considered the prior art most popular IKP methods. Among the articles which use these methods, see articles by Liegeois, A. 1977, "Automatic supervisory control of the configuration and behavior of multi-body mechanisms", IEEE Trans., Systems, Man, and Cybernetics, SMC-7, by Klein, C. A. and Huang, C. H. 1983, "Review of pseudo-inverse control for use with kinematically redundant manipulators", IEEE Trans. Systems, Man, and Cybernetics SMC 13, pp. 245-250, by Hollerback, J. M., and Suh, K. C. 1985, "Redundancy resolution of manipulators through torque optimization", Proc. IEEE Int. Conf. on Robotics and Automation, pp. 1016-1021, and by Nakamura, Y., and Hanafusa, H., 1985, "Task priority based redundancy control of robot manipulators in robotics research", the Second International Symposium, eds. H. Hanafusa and H. Inoue, Cambridge, Mass. M.I.T. Press, pp. 155-162.

To control a manipulator to move along a specified Cartesian trajectory, it is required to compute the torques and forces needed to drive all the joints simultaneously with coordination, in order for the end effector to achieve the desired Cartesian trajectory. Most of the modern Cartesian-based robot control strategies and techniques require the computation of the jacobian pseudo-inverse to solve the IKP at the joint acceleration level. The resulting joints accelerations are used with the robot dynamics-based equations of motion (highly coupled non linear second order ordinary differential equations) to compute the actuator torques. This technique is known as the resolved acceleration control. For a general background about this technique, reference is made to an article by Johnson Y. S. Luh, Michael W. Walker, and Richard P. C. Paul, "Resolved acceleration control of mechanical manipulators", IEEE transactions on automatic control 25, 3 1980, pp. 468-474. The equations of motion are computationally complex. To eliminate the restriction of this computational complexity on the evaluation of dynamics-based joint control, well-established techniques, based on symbolic reduction techniques, have been described in articles such as "The explicit dynamic model and inertial parameters of the Puma 560 arm" by B. Armstrong, O. Khatib, and J. Burdick, in Proceedings of the IEEE International Conference on Robotics and Automation, San Francisco, Calif., April 1986, pp. 510-518, and "Efficient Dynamics for a Puma-600" by M. B. Leahy, Jr., L. M. Nugent, K. P. Valavanis, and G. N. Saridis, Proceedings of the IEEE International Conference on Robotics and automation, San Francisco, Calif., April 1986, pp. 519-524, and their references. Application of this dynamics-based joint control in the Cartesian space (resolved acceleration control) has been limited by the additional requirements of efficient computation of the robot jacobian pseudo-inverse, especially when the jacobian is rank deficient.

From the foregoing, we note the important role of the jacobian pseudo-inverse in most IKP algorithms as well as most Cartesian-based control methods.

SHORTCOMINGS OF THE PRIOR ART SCHEMES

Although various numerical schemes using the pseudo-inverse, such as those described above, have good performance and features when the robot is away from singularities, in the neighborhood of a singularity, these schemes fail. Near singularities the jacobian becomes ill-conditioned and the pseudo-inverse solution generates large errors. None of the approaches described above overcome the singularity problem. In an effort to alleviate this problem, recently P. R. Chang and C. S. G. Lee in the article "Residue Arithmetic VLSI Array Architecture For Manipulator Pseudo-Inverse Jacobian Computation", 1988 IEEE International Conference of Robotics and Automation, proposed a VLSI architecture for a numerical scheme for computation of the jacobian pseudo-inverse. Unfortunately, the shortcomings of their method are as follows:

(1) The procedures used are based on numerical schemes which are iterative and therefore would not be efficient for real time robot control.

(2) In addition, numerical schemes typically introduce errors, and are not 100% stable, especially when the robot is at or near singularities.

(3) Moreover, and more importantly, their method is based on numerical schemes and therefore it is very difficult to find any analytical results that may be used in the evaluation of robot performance as well as future design of robot prototypes (as discused further below).

In accordance with the present invention, the deficiency of the prior art robot Cartesian control techniques near singularities is overcome by using an entirely different strategy for efficiently computing the robot jacobian pseudo-inverse. In view of the above background of this invention, there is a need for economical computers and methods for computing more efficiently the robot jacobian pseudo-inverse, which is required and critical in most modern Cartesian-based control techniques and IKP schemes. It is the solution of this type of problem to which the present invention is directed.

BRIEF DESCRIPTION OF THE DRAWINGS

FIG. 2-25 is a general flow chart of the algorithm of the present invention for constructing the first subset of the orthonormal basis needed for the Megherbi Matrix Decomposition.

FIG. 3 is a general flow chart of the algorithm of the present invention for constructing the second subset of the orthonormal basis needed for the Megherbi Matrix Decomposition.

FIG. 5 is a general flow chart of the computer method of the present invention for implementing the results of algorithms of FIG.-2 and FIG.-3 on a general purpose digital computer.

FIG. 6 is a block diagram of a robot control system using the computer method of FIG.-5 and algorithms of FIG. 2 and FIG. 3.

FIG. 7-10 are computer simulations of planar two-link and planar 4-link redundant robots in motion according to the invention.

FIGS. 11-23 represent the robot joint and Cartesian position, velocity and acceleration time history.

SUMMARY OF THE INVENTION

Figure 1A:
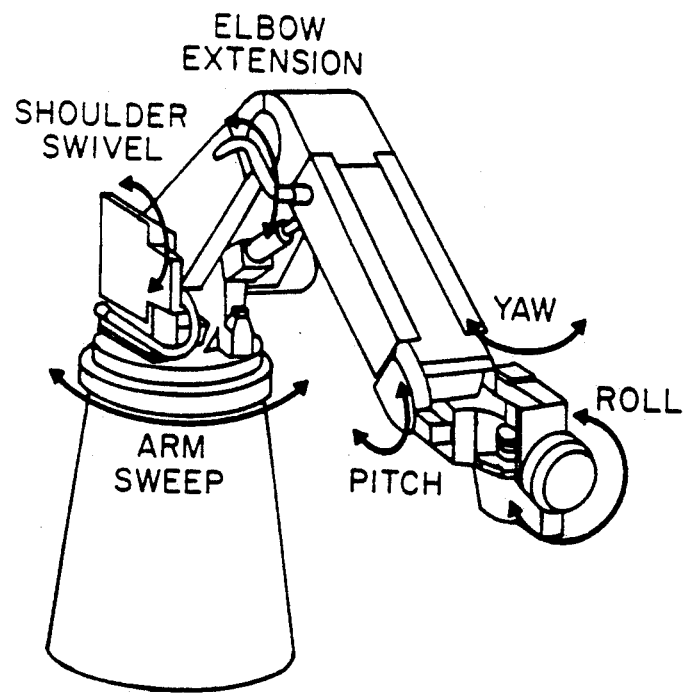
FIG. 1(a)-(c) are graphical representations of three examples of existing six-degree-of-freedom industrial robot manipulators with spherical wrists.

The present invention is a novel method and a general purpose computer method for resolving robot kinematic singularities, and for efficient and exact computational formulation for the robot jacobian pseudo-inverse. These efficient and exact computational formulations for the robot jacobian pseudo-inverse are stable and fast enough to permit the real time implementation of most Cartesian-based robot control strategies and techniques. The efficient computation of the robot pseudo-inverse is done, in accordance with this invention, by effect of two steps, first, by effect of special symbolic decomposition of the robot jacobian under the Megherbi Matrix Decomposition form, and secondly, by effect of a computer method for the efficient implementation of the resulting analytical steps on a general purpose digital computer. The Megherbi Matrix Decomposition has been made possible by the use of the Megherbi Matrix Decomposition theorem, which will be discussed hereinafter in the detailed description section.

In accordance with the present invention, the algorithm and procedure for achieving the Megherbi Matrix Decomposition (MMD) of an $m \times n$ matrix A of rank r, $r \leq m \leq n$, which will be rigorously detailed herein after in the detailed description section, can be understood better by considering the flow charts of FIG. 2 and FIG. 3. An orthonormal basis $\{u_1, u_2, \ldots, u_r, u_{r+1}, \ldots, u_m\}$ is constructed in an m-dimensional vector space. The first subset basis $\{u_{r+1}, u_{r+2}, \ldots, u_m\}$, is an orthonormal basis for the null space of the matrix transpose of the matrix A noted $A^T$, and is constructed according to the algorithm outlined in the flow chart of FIG. 2. To extend the orthonormal basis $\{u_{r+1}, u_{r+2}, \ldots, u_m\}$ to an orthonormal basis for the whole m-dimensional vector space, an orthonormal basis $\{u_1, u_2, \ldots, u_r\}$, for the range space of the matrix A, is constructed according to the algorithm outlined in the flow chart of FIG. 3. Let $U_1$ and $U_2$ be the matrices defined respectively as $U_1 = (u_1, u_2, \ldots, u_r)$ and $U_2 = (u_{r+1}, u_{r+2}, \ldots, u_m)$.

To construct the above orthonormal basis in an m-dimensional vector space, an operator, which is the generalization of the cross product operator of two vectors in a three dimensional vector space, is defined and introduced by the inventor to determine an $m \times 1$ vector which is orthogonal to $(m-1)$ linearly independent vectors in an m-dimensional vector space. When the orthonormal matrix $U = (u_1, u_2, \ldots, u_m)$ is constructed according to the algorithm whose steps are outlined in flow charts of FIG. 2 and FIG. 3, the diagonal matrix W and matrix $V^T$ of full rank, are obtained by computing the matrix, $V^* = (V_1^*, V_2^*)$, product of the two matrices $A^T$ and U, where the matrix $V_1^*$ is defined as $V_1^* = A^T U_1$ and the matrix $V_2^*$ is defined as any $n \times (m-r)$ matrix and may be chosen such that its columns form with the columns of the matrix $V_1$ a set of linearly independant unit vectors. The matrix $V_2^*$ may be defined such that each of its column vectors is orthogonal to the column vectors of the matrix $V_1^*$. The resulting matrix, $V^* = (V_1^*, V_2^*)$, is then decomposed under the product of a matrix $V = (V_1, V_2)$ of full rank and a diagonal matrix $$W = \begin{bmatrix} W_0 & 0 \\ 0 & 0 \end{bmatrix}$$

of rank r, where $V_1^* = W_0 V_1$ and $V_2^* = V_2$, according to algorithm 1, whose steps are described herein after in the detailed description section. The MMD of the matrix A is then given by $A = UWV^T$. The components $\{w_j, j = 1, 2, \ldots, m\}$ of the diagonal matrix W are defined and referred to, herein and in the rest of this patent application, as the MMD diagonal values of the matrix A. When the MMD of the matrix A, $A = UWV^T$, is established then the Moore-Penrose pseudo-inverse matrix of A, noted $A^+$, is given by $A^+ = V(V^T V)^{-1} W^+ U^T = V_1(V_1^T V_1)^{-1} W_0^{-1} U_1^T$; where $X^{-1}$ denotes the matrix inverse of the matrix X, and where the components, $\{d_j, j = 1, 2, \ldots, m\}$, of the diagonal matrix $W^+$ are defined and given by:

$$d_j = \begin{cases} \dfrac{1}{w_j} & \text{if } w_j \neq 0 \\ 0 & \text{if } w_j = 0 \end{cases} \quad j = 1, 2, \ldots m$$

In accordance with this present invention, when the MMD-based pseudo-inverse of a matrix A is established, a computer method, which is based on the algorithm outlined in the flow chart of FIG. 5 which will be detailed hereinafter in the detailed description, emphasizes on considerations relevant to the implementation and performance of the analytical steps of the resulting symbolic pseudo-inverse on a digital computer. This computer method takes explicit considerations of round-off errors, overflow as well as treatment of numerical stability of the algorithm when the matrix A becomes ill-conditioned. In preferred and efficient embodiment of the present invention, the newly constructed method for efficient, stable, and exact computational formulation of the pseudo-inverse of a matrix A, is applied to compute efficiently the robot jacobian pseudo-inverse which is required in most modern Cartesian robot computer control systems. In conjunction with the preferred embodiments, the major advantages of the present invention are:

- stability for resolving inverse kinematic singularities with which the robot pseudo-inverse can be computed when the jacobian is ill-conditioned.
- efficiency and speed (after using symbolic reduction techniques) with which the robot pseudo-inverse can be computed.
- this efficient, stable, and exact computation of the robot jacobian pseudo-inverse permits the real time implementation of most Cartesian-based robot control strategies and techniques.
- this special symbolic MMD of the robot jacobian is of special importance in the evaluation of robot performance as well as future design of prototypes of robot manipulators. It offers analytical results which lead to a better understanding of the relation between the dynamics and kinematics of the robot (relations not clearly understood as of today) as well as the determination of some properties of the robot workspace (as discussed in the detailed description section). These special, important and fundamental features of this invention are not offered by any other numerical method.

Additional features of this invention will appear through the following detailed description in which the preferred embodiments of the invention have been set forth in detail in conjunction with the drawings.

DETAILED DESCRIPTION

GENERAL

The present invention provides a method and algorithm to decompose symbolically the robot jacobian matrix under the Megherbi Matrix Decomposition form (MMD), and provides a special purpose computer and method to implement and perform these symbolic steps. This symbolic decomposition of the robot jacobian, which has been made possible with the use of the Megherbi Matrix Decomposition theorem, is of special importance for the determination of the jacobian pseudoinverse when the robot jacobian is ill-conditioned. The technique brought by this present invention has superior stability and speed relative to prior art numerical iterative methods, and is fast enough to permit the real time implementation of most modern Cartesian space manipulator control strategies. These Cartesian based control strategies have until now been limited by the requirement of efficient and stable methods for computing the robot jacobian pseudo-inverse.

Of special interest of this invention is the fact that the resulting symbolic MMD form of the pseudo-inverse shows clearly, and permits some analysis leading to a better understanding of the resulting robot control system, which is not possible by any other numerical method. It also gives insight and a better understanding of the relation between the dynamics and kinematics of the robot, a relation, which is still not clearly understood to this day. More specifically, the present invention answers the question of planning Cartesian trajectories, which, in order to be executed by the robot, will require torques and forces that are within the physical limitations of the robot actuators; and if, the trajectory is not realizable, how it can be modified on line in order not to exceed the actuator torque limits. The present invention leads to a better understanding of and gives answers to these fundamental questions which are still unanswered and not clearly understood to this day. In addition, the principles of this invention are of special importance in the design of future prototypes of robot manipulators.

Even though the preferred embodiment of this invention has been chosen to be the robotics field, the principles of this invention are suitable for any other field or application characterized by the problem of solving a linear system $A(\theta)x = y$; where the matrix $A(\theta)$ is either rank deficient or else numerically ill-conditioned dependently on the parameter $\theta$. Examples of such applications are robotics (preferred embodiment of this invention), the problem of bifurcation in the fluid mechanics field, linear multi-variable systems and control theory, etc.

MATHEMATICAL DERIVATION

The present invention can be better understood with reference to the following theorem, that the inventor has established and refers to as the Megherbi Matrix Decomposition theorem (MMD).

MMD THEOREM

For any $m \times n$ Matrix A of rank $r$, $r \leq m \leq n$, there exist an $n \times m$ matrix V of full rank, an $m \times m$ orthonormal matrix U, and an $m \times m$ diagonal matrix $$W = \begin{bmatrix} W_0 & 0 \\ 0 & 0 \end{bmatrix}.$$

$W_0$ being a diagonal matrix of rank $r$, such that $A = UWV^T$. The matrix $V^T$ denotes the matrix transpose of the matrix V.

PROOF

Let $\{u_{r+1}, u_{r+2}, \ldots, u_m\}$ be an orthonormal basis for the null space of the $n \times m$ matrix $A^T$, and let $U_2$ be the $m \times (m-r)$ orthonormal matrix defined as $U_2 = (u_{r+1}, u_{r+2}, \ldots, u_m)$. Let $\{u_1, u_2, \ldots, u_r\}$ be an orthonormal basis for the range space of the matrix A, which represents the extension of the set of orthonormal vectors $\{u_{r+1}, u_{r+2}, \ldots, u_m\}$ to a set of orthonormal vectors which forms an orthonormal basis for the whole m-dimensional space. Recall that it is well known and established that it is always possible to extend a set of linearly independant vectors in an m-dimensional space to a set of linearly independant vectors which forms a basis for the whole m-dimensional space. Let $U_1$ be the $m \times r$ matrix defined as $U_1 = (u_1, u_2, \ldots, u_r)$. The proof of the theorem may be based on the observation that if $\{u_1, u_2, \ldots, u_r\}$ is an orthonormal basis for the range space of the matrix A of rank r, then there exist r n-dimensional linearly independant column vectors $v_i^*$ such that, $$A^T u_i = v_i^* \quad i = 1, 2, \ldots, r$$

and such that, $$A^T U_1 = V_1^*$$

where the $n \times r$ matrix $V_1^*$ is defined as $V_1^* = (v_1^*, v_2^*, \ldots, v_r^*)$. More specifically, let $\{a^1, a^2, \ldots, a^r\}$ be a set of r linearly independant column vectors of the matrix A, and let $A_r$ be the $m \times r$ submatrix of A defined as $A_r = (a^1, a^2, \ldots, a^r)$. Consequently the $r \times r$ matrix $V_r$ defined as, $$V_r = A_r^T U_1$$

is a matrix of full rank r, since its r rows vectors are the r linearly independant vectors $\{a^1, a^2, \ldots, a^r\}$ expressed in the new basis $\{u_1, u_2, \ldots, u_r\}$. The set of row vectors of the matrix $V_r$ is a subset of the set of row vectors of the matrix $V_1^*$; consequently, there exist r row vectors of the $n \times r$ matrix $V_1^*$ which are linearly independant, and therefore the matrix $V_1^*$ is of full rank. Consequently, there exist an $r \times r$ diagonal matrix $W_0$ of rank r and an $n \times r$ matrix $V_1$ of full rank such that, $$A^T U_1 = V_1 W_0$$

where the column vectors of the matrix $V_1$, noted $\{v_i \ i = 1, 2, \ldots, r\}$, are unit vectors which are defined as, $$v_i = \frac{v_i^*}{||v_i^*||_2} = \frac{v_i^*}{w_{0i}} \quad i = 1, 2, \ldots, r$$

where the elements $\{w_{0i} \ i = 1, 2, \ldots, r\}$ of the diagonal matrix $W_0$ are non negative, and it is convenient to rearrange these elements such that, $$w_{01} \geq w_{02} \geq \ldots \geq w_{0r} \geq 0$$

Let $V_2 = (v_{r+1}, v_{r+2}, \ldots, v_m)$ be any $n \times (m-r)$ matrix whose columns form with the columns of the matrix $V_1$ a set of linearly independant unit vectors. The matrix $V_2$ may be defined such that each of its column vectors is orthogonal to the column vectors of the matrix $V_1$, (it can be proven that the column vectors of the matrix $V_2$, as defined above, are in the null space of the matrix A). Since $U_2$ is the matrix whose column vectors form an orthonormal basis for the null space of the matrix $A^T$, therefore we have, $$A^T U_2 = 0 = V_2 \cdot 0$$

and if we define the m×m matrix U, the m×m matrix W, and the n×m matrix V respectively by, $$U = (U_1, U_2), V = (V_1, V_2), \text{ and } W = \begin{bmatrix} W_0 & 0 \\ 0 & 0 \end{bmatrix}$$

then, $$A^T(U_1, U_2) = A^T U = (V_1, V_2) \begin{bmatrix} W_0 & 0 \\ 0 & 0 \end{bmatrix} = VW.$$

Therefore, $$A = UWV^T$$

NOTE

The method (algorithm) to construct such decomposition of a matrix is given hereinafter in the detailed description, in the section MMD algorithm.

COROLLARY

If $$A = U \begin{bmatrix} W_0 & 0 \\ 0 & 0 \end{bmatrix} V^T$$

is a MMD of an m×n matrix A of rank r, r≦m≦n, then the exact n×m Moore-Penrose pseudo-inverse matrix of the matrix A, noted $A^+$, is given by, $$A^+ = V(V^T V)^{-1} \begin{bmatrix} W_0^{-1} & 0 \\ 0 & 0 \end{bmatrix} U^T = V_1(V_1^T V_1)^{-1} W_0^{-1} U_1^T$$

PROOF

It is well known and established that by definition the matrix pseudo-inverse of an m×n matrix A is an n×m matrix, noted $A^+$, which verifies the following properties:
1) $AA^+A = A$
2) $A^+AA^+ = A^+$
3) $(A^+A)^T = A^+A$
4) $(AA^+)^T = AA^+$ Therefore, to prove the above corollary, it is necessary and sufficient to show that the matrix $$A^+ = V(V^T V)^{-1} \begin{bmatrix} W_0^{-1} & 0 \\ 0 & 0 \end{bmatrix} U^T,$$

which is based on the MMD of the matrix A, verifies the above four properties, i.e., $$AA^+A = UWV^T V(V^T V)^{-1} \begin{bmatrix} W_0^{-1} & 0 \\ 0 & 0 \end{bmatrix} U^T UWV^T \quad 1)$$

since U is an orthonormal matrix, then $U^T U = I_{m \times m}$, where $I_{m \times m}$ is an m×m identity matrix. Therefore, we have, $$AA^+A = U \begin{bmatrix} I_{r \times r} & 0 \\ 0 & 0 \end{bmatrix} WV^T = U \begin{bmatrix} W_0 & 0 \\ 0 & 0 \end{bmatrix} V^T = A$$

where $I_{r \times r}$ is an r×r identity matrix.

$$A^+AA^+ = V(V^T V)^{-1} \begin{bmatrix} W_0^{-1} & 0 \\ 0 & 0 \end{bmatrix} U^T UWV^T (V^T V)^{-1} \begin{bmatrix} W_0^{-1} & 0 \\ 0 & 0 \end{bmatrix} U^T \quad 2)$$

$$= V(V^T V)^{-1} \begin{bmatrix} I_{r \times r} & 0 \\ 0 & 0 \end{bmatrix} \begin{bmatrix} W_0^{-1} & 0 \\ 0 & 0 \end{bmatrix} U^T = V(V^T V)^{-1} \begin{bmatrix} W_0^{-1} & 0 \\ 0 & 0 \end{bmatrix} U^T = A^+$$

$$(A^+A)^T = \left( V(V^T V)^{-1} \begin{bmatrix} W_0^{-1} & 0 \\ 0 & 0 \end{bmatrix} U^T UWV^T \right)^T \quad 3)$$

$$= \left( V(V^T V)^{-1} \begin{bmatrix} I_{r \times r} & 0 \\ 0 & 0 \end{bmatrix} V^T \right)^T$$

Since the matrix $(V^T V)^{-1} \begin{bmatrix} I_{r \times r} & 0 \\ 0 & 0 \end{bmatrix}$ is symmetric then, $$\left( (V^T V)^{-1} \begin{bmatrix} I_{r \times r} & 0 \\ 0 & 0 \end{bmatrix} \right)^T = (V^T V)^{-1} \begin{bmatrix} I_{r \times r} & 0 \\ 0 & 0 \end{bmatrix}$$

Consequently we have, $$(A^+A)^T = \left(V(V^TV)^{-1}\begin{bmatrix}I_{r\times r} & 0\\ 0 & 0\end{bmatrix}V^T\right)^T = V(V^TV)^{-1}\begin{bmatrix}I_{r\times r} & 0\\ 0 & 0\end{bmatrix}V^T$$

$$= A^+A$$

$$(AA^+)^T = \left(UWV^TV(V^TV)^{-1}\begin{bmatrix}W_0^{-1} & 0\\ 0 & 0\end{bmatrix}U^T\right)^T = \left(U\begin{bmatrix}I_{r\times r} & 0\\ 0 & 0\end{bmatrix}U^T\right)^T \quad 4)$$

$$= U\begin{bmatrix}I_{r\times r} & 0\\ 0 & 0\end{bmatrix}U^T = AA^+$$

NOTES

The components $\{w_i\ i=1,2,\ldots,m\}$ of the diagonal matrix W are defined by the inventor and referred to, here in and in the rest of this patent application as the MMD diagonal values of a matrix.

If the m×n matrix A of rank r is such that $n \leq m \leq r$, then the MMD of the matrix A is the transpose of the MMD of the matrix $A^T$.

The matrix A may be time or parameter varying, as it is the case, for example, in robotics where the robot jacobian matrix depends on the robot configuration.

The MMD theorem can be considered as one of the most powerful tools of linear algebra. The well known Singular Value Decomposition theorem, one of the most powerful tools in linear algebra,—described in the article by Virginia C. Klema and Alan J. Laub, "The singular value Decomposition: Its Computation and Some Application", IEEE transactions on automatic control, Vol. AC-25, No. 2, April 1980, and the book by G. H. Golub, "Matrix Computations", 1983 by the Johns Hopkins University Press—, can be considered only a special case of the MMD theorem, i.e., a special case where both the matrices U and V are orthogonal. The shortcomings of the Singular Value Decomposition (SVD) are as follows:

(1) The scheme used to generate the SVD of a matrix A is purely numerical and is based on very costly iterative numerical procedures. Therefore the numerical SVD scheme would not be appropriate for real time application or process, such as robot control. In addition the numerical procedures, typically, introduces errors.

(2) The SVD scheme, being a numerical scheme, does not offer the major advantage that the symbolic MMD method offers, namely, and in accordance with the embodiment of the present invention, some analytical results leading to a better understanding and evaluation of the resulting robot control system when the robot is at, near, or away from a singular point.

PROPERTIES

Let $\{\sigma_1,\sigma_2,\ldots,\sigma_m\}$ denote the singular values of an m×n matrix A, with $\sigma_1$ and $\sigma_m$ being respectively the maximum and minimum of these singular values. Let $\{w_1,w_2,\ldots,w_m\}$ be one set of MMD diagonal values of this same matrix A, with $w_1$ and $w_m$ being respectively the maximum and minimum of these MMD diagonal values. The following properties hold:

$$\sum_{i=1}^{m} \sigma_i^2 = \sum_{i=1}^{m} w_i^2 \quad 1)$$

$$w_1 \leq \sigma_1 \leq \left(\sum_{i=1}^{m} w_i^2\right)^{\frac{1}{2}} \text{ and } \sigma_m \leq w_m \quad 2)$$

$$\frac{\sigma_m}{\sigma_1} \leq \frac{w_m}{w_1} \quad 3)$$

MMD ALGORITHM

In this section, the algorithm for performing the MMD of an m×n matrix A of rank r is given. For clear understanding of this algorithm, an illustrative example is given. Examples of applicability of this algorithm to the robotics field, are given afterward, for a better understanding of the preferred embodiment of the present invention.

ALGORITHM 1: MMD ALGORITHM.

Step 1: construct an orthonormal basis of vectors $\{u_1,u_2,\ldots,u_m\}$, such that $\{u_1,u_2,\ldots,u_r\}$ forms an orthonormal basis for the range space of the matrix A, and such that $\{u_{r+1},u_{r+2},\ldots,u_m\}$ forms an orthonormal basis for the null space of the matrix $A^T$. Step 1 is performed with the use of algorithm 2 given herein below.

Step 2: for each vector $u_i$, compute the vector $v_i^*$ defined as, $v_i^* = A^T u_i\ i=1,2,\ldots,m$.

Step 3: for each vector $v_i^*$ compute its 2-norm $w_i$, defined as $w_i = ||v_i^*||_2\ i=1,2,\ldots,m$.

Step 4: compute for each vector $v_i^*$, the vector $v_i$, defined as $$v_i = \frac{v_i^*}{w_i} \quad i = 1, 2, \ldots, m.$$

Step 5: form the matrices $V=(v_1,v_2,\ldots,v_m)$, $W=\text{diagonal}(w_1,w_2,\ldots,w_m)$, and $U=(u_1,u_2,\ldots,u_m)$.

Step 6: The MMD of the matrix A is then given by $A = AWV^T$.

Before presenting algorithm 2 for constructing the orthonormal basis $\{u_1,u_2,\ldots,u_m\}$, we will summarize briefly the definition of the operator noted, $L^m$, that the inventor introduced and used in algorithm 2.

DEFINITION

Let $v_1,v_2,\ldots,v_{m-1}$, be a set of m—1 vectors in an m-dimensional vector space, and let $\{e_1,e_2,\ldots,e_m\}$ be an orthonormal basis in that space. Let $L^m$ be the operator, which will be defined herein below, which for the above set of vectors assigns an m-dimensional vector, $v_m$, which is orthogonal to this set of vectors, and denoted by $v_m = L^m(v_1, v_2, \ldots, v_{m-1})$. Let B be the $m \times m$ matrix defined such that its first row is the row formed by $e_1, e_2, \ldots, e_m$, and such that the rest of the rows are the transpose of the columns vectors $\{v_1, v_2, \ldots, v_{m-1}\}$, i.e., $$B = \begin{bmatrix} e_1 e_2 \ldots e_m \\ v_1^T \\ v_2^T \\ \vdots \\ v_{m-1}^T \end{bmatrix}$$

We define thus the operator $L^m$ as follow:

$$v_m = L^m(v_1, v_2, \ldots, v_{m-1}) = \sum_{i=0}^{m} \sigma_i e_i |A_i|$$

where by definition, $$-\sigma_i = \begin{cases} 1 & \text{if } i \text{ even} \\ -1 & \text{if } i \text{ add} \end{cases} \quad i = 1, 2, \ldots, m$$

$A_i$, is an $(m-1) \times (m-1)$ submatrix of B, which is obtained by crossing out the first row and the $i^{th}$ column of the matrix B.

$|A_i|$ = determinant of the matrix $A_i$.

Remark: One can think of the operator that the inventor has defined here as the generalization of the cross product operator of two vectors in a 3-dimensional vector space, to a cross product of $(m-1)$ vectors in an m-dimensional space. Likewise, we may expect the vector $v_m$, defined as $v_m = L^m(v_1, v_2, \ldots, v_{m-1})$, is a vector orthogonal to all the vectors $v_1, v_2, \ldots, v_{m-1}$.

For a better understanding of the foregoing, consider the following example: in a 4-dimensional vector space we want to compute the vector $v_4$ which is orthogonal to the following three vectors $v_1, v_2, v_3$, defined as, $$v_1 = \begin{bmatrix} 1 \\ 0 \\ 0 \\ 1 \end{bmatrix}, v_2 = \begin{bmatrix} 2 \\ 0 \\ 1 \\ 1 \end{bmatrix}, v_3 = \begin{bmatrix} 1 \\ 1 \\ 0 \\ 0 \end{bmatrix}$$

According to the foregoing, $v_4 = L^4(v_1, v_2, v_3)$
The matrix B in this case is defined as, $$B = \begin{bmatrix} e_1 & e_2 & e_3 & e_4 \\ 1 & 0 & 0 & 1 \\ 2 & 0 & 1 & 1 \\ 1 & 1 & 0 & 0 \end{bmatrix}$$

The vector $v_4$, according to the foregoing is then determined as, $$v_4 = \sigma_1 e_1 \begin{vmatrix} 0 & 0 & 1 \\ 0 & 0 & 1 \\ 1 & 0 & 1 \end{vmatrix} + \sigma_2 e_2 \begin{vmatrix} 1 & 0 & 1 \\ 2 & 1 & 1 \\ 1 & 0 & 0 \end{vmatrix} + \sigma_3 e_3 \begin{vmatrix} 1 & 0 & 1 \\ 2 & 0 & 1 \\ 1 & 1 & 0 \end{vmatrix} +$$

$$\sigma_4 e_4 \begin{vmatrix} 1 & 0 & 0 \\ 2 & 0 & 1 \\ 1 & 1 & 0 \end{vmatrix}$$

$$v_4 = -e_1 + e_2 + e_3 + e_4$$

The vector $v_4$ is therefore, $$v_4 = \begin{bmatrix} -1 \\ 1 \\ 1 \\ 1 \end{bmatrix}$$

We can verify by inspection that the vector $v_4$ is indeed orthogonal to all the three vectors $v_1, v_2, v_3$. Now, algorithm 2 is presented.

ALGORITHM 2

Algorithm for constructing in an m-dimensional vector space an orthonormal basis, $\{u_1, u_2, \ldots, u_m\}$, such that the first subset basis $\{u_1, u_2, \ldots, u_r\}$ forms an orthonormal basis for the range space of the matrix A, and such that the second subset basis $\{u_{r+1}, u_{r+2}, \ldots, u_m\}$ forms an orthonormal basis for the null space of the matrix $A^T$. The method of constructing the orthonormal basis $\{u_{r+1}, u_{r+2}, \ldots, u_m\}$ as outlined in the flow chart of FIG. 2 is as follows:

Step 1: Choose r linearly independant columns of the matrix A, namely, $\{a_1^*, a_2^*, \ldots, a_r^*\}$. Let the matrix $A^*$ be defined as $A^* = (a_1^*, a_2^*, \ldots, a_r^*)$. We do not lose any generality of the algorithm, by assuming for simplicity that the first r rows of the matrix $A^*$ are linearly independent. If this is not the case we can always permute the rows of the matrix $A^*$ such that this is true. Form the matrix $B^{r+1} = (a_1^{r+1*}, a_2^{r+1*}, \ldots, a_r^{r+1*})$, composed of the first $(r+1)$ rows of $A^*$, and compute the vectors $a_i^{r+1}$, defined as, $$a_i^{r+1} = \frac{a_i^{r+1*}}{||a_i^{r+1*}||_2} \quad i = 1, 2, \ldots, r$$

Step 2: compute the $(r+1)$ dimensional vector $\bar{u}^{r+1}$ given by, $$\bar{u}_{r+1} = L^{r+1}(a_1^{r+1}, a_2^{r+1}, \ldots, a_r^{r+1})$$

Step 3: The vector $u_{r+1}$ is then given by $$u_{r+1} = \begin{bmatrix} \bar{u}_{r+1} \\ \hline 0 \end{bmatrix} \begin{matrix} \}r+1 \\ \}m-(r+1) \end{matrix}$$

Step 4: If $(r+2 > m)$ skip the following steps and jump to Step 7.

Step 5: Form the $(r+2)$ dimensional vector $u_{r+1}^{r+2}$ as, $$u'^{r+2}_{r+1} = \left[\begin{array}{c} \left[\begin{array}{c} u_{r+1} \\ \hline 0 \end{array}\right] \end{array}\right] \begin{array}{l} \}r+1 \\ \}1 \end{array}$$

Step 6: For i=2 to i=m−r, do the following steps: form the matrix $B^{r+i}=(a_1^{r+i*},a_2^{r+i*},\ldots,a_r^{r+i*})$, composed of the first (r+i) rows of the matrix $A^*$, and compute the (r+i)-dimensional vectors $a_j^{r+i*}$ defined as, $$a_j^{r+i} = \frac{a_j^{r+i*}}{||a_j^{r+i*}||_2} \quad j=1,2,\ldots,r$$

compute the (r+i) dimensional vector $\bar{u}_{r+i}$ defined as, $$\bar{u}_{r+i} = L^{r+i}(a_1^{r+i},a_2^{r+i},\ldots,a_r^{r+i},u_{r+1}^{r+i},u_{r+2}^{r+i},\ldots,u_{r+i-1}^{r+i})$$

The vector $u_{r+i}$ is then given by, $$u_{r+i} = \left[\begin{array}{c} \left[\begin{array}{c} \bar{u}_{r+i} \\ \hline 0 \end{array}\right] \end{array}\right] \begin{array}{l} \}r+i \\ \}m-(r+i) \end{array}$$

If (r+1+i)>m) skip the following steps and jump to Step 7.
For j=1,2,...,i form the following vectors:

$$u_{r+j}^{r+i+1} = \left[\begin{array}{c} \left[\begin{array}{c} \bar{u}_{r+j} \\ \hline 0 \end{array}\right] \end{array}\right] \begin{array}{l} \}r+j \\ \}1+i-j \end{array}$$

Step 7: Through the remaining steps of this algorithm, as outlined in the flow chart of FIG. 3, the orthonormal basis $\{u_1,u_2,\ldots,u_r\}$ is constructed.

Step 8: for i=0, to i=r−2, compute the m-dimensional vectors $u_{r-i}$, defined as, $$u_{r-i} = L^m\left(\frac{a_1^*}{||a_1^*||_2}, \frac{a_2^*}{||a_2^*||_2}, \ldots, \frac{a_{r-i-1}^*}{||a_{r-i-1}^*||_2}, u_{r-i+1}, \ldots, u_m\right)$$

Step 9:

$$u_1 = \frac{a_1^*}{||a_1^*||_2}$$

Step 10: form the matrix $U=(u_1,u_2,\ldots,u_m)$
For a better understanding of the algorithm the following example is given:

EXAMPLE

The MMD algorithm described above is used to determine the pseudo-inverse of the 3×3 (m=n=3) matrix defined as:

$$A(p) = \left[\begin{array}{c} 110 \\ 010 \\ 00p \end{array}\right]$$

where p is a non-negative real variable.

The determinant of the matrix A(p) is $|A(p)|=p$. For p=0, the matrix A(p) is rank deficient and its rank drops from 3 to 2. To compute the Moore-Penrose pseudo-inverse of the matrix A(p), we use the MMD algorithms 1 and 2.

ALGORITHM 2

Step 1:
We have to construct an orthonomral basis $u_1,u_2,u_3$ where $u_3$ is orthogonal to the range space of the matrix A.

$$\text{Let } a_1^* = \left[\begin{array}{c} 1 \\ 0 \\ 0 \end{array}\right] a_2^* = \left[\begin{array}{c} 1 \\ 1 \\ 0 \end{array}\right]$$

$$B^3 = (a_1^{3*}, a_2^{3*}) = \left[\begin{array}{c} 11 \\ 01 \\ 00 \end{array}\right],$$

$$a_1^3 = \left[\begin{array}{c} 1 \\ 0 \\ 0 \end{array}\right] a_2^3 = \left[\begin{array}{c} \frac{1}{\sqrt{2}} \\ \frac{1}{\sqrt{2}} \\ 0 \end{array}\right]$$

Step 2:

$$\bar{u}_3 = L^3(a_1^3, a_2^3) = \left[\begin{array}{c} 0 \\ 0 \\ 1 \end{array}\right]$$

Step 3:

$$u_3 = \bar{u}_3 = \left[\begin{array}{c} 0 \\ 0 \\ 1 \end{array}\right]$$

Step 8:

$$u_2 = L^3\left(\frac{a_i^{3*}}{||a_1^{3*}||_2}, u_3\right) = \left[\begin{array}{c} 0 \\ 1 \\ 0 \end{array}\right]$$

Step 9:

$$u_1 = a_1^3 = \left[\begin{array}{c} 1 \\ 0 \\ 0 \end{array}\right]$$

Step 10:
In this case the matrix U is the identity matrix.

ALGORITHM 1

Step 2:

-continued $$A^T u_1 = \begin{bmatrix} 100 \\ 110 \\ 00p \end{bmatrix} \begin{bmatrix} 1 \\ 0 \\ 0 \end{bmatrix} = \begin{bmatrix} 1 \\ 1 \\ 0 \end{bmatrix} = \sqrt{2} \begin{bmatrix} \frac{1}{\sqrt{2}} \\ \frac{1}{\sqrt{2}} \\ 0 \end{bmatrix}$$

$$A^T u_2 = \begin{bmatrix} 0 \\ 1 \\ 0 \end{bmatrix}$$

$$A^T u_3 = p \begin{bmatrix} 0 \\ 0 \\ 1 \end{bmatrix}$$

Step 3:

$$w_1 = \sqrt{2}, w_2 = 1, w_3 = p$$

Step 4:

$$v_1 = \begin{bmatrix} \frac{1}{\sqrt{2}} \\ \frac{1}{\sqrt{2}} \\ 0 \end{bmatrix} v_2 = \begin{bmatrix} 0 \\ 1 \\ 0 \end{bmatrix} v_3 = \begin{bmatrix} 0 \\ 0 \\ 1 \end{bmatrix}$$

Step 5 and Step 6:

$$A = \begin{bmatrix} 1 & 0 & 0 \\ 0 & 1 & 0 \\ 0 & 0 & 1 \end{bmatrix} \begin{bmatrix} \sqrt{2} & 0 & 0 \\ 0 & 1 & 0 \\ 0 & 0 & p \end{bmatrix} \begin{bmatrix} \frac{1}{\sqrt{2}} & \frac{1}{\sqrt{2}} & 0 \\ 0 & 1 & 0 \\ 0 & 0 & 1 \end{bmatrix}$$

The pseudo-inverse of the matrix A (p), A (p)$^+$, is then given by, $$A^+(p) = \begin{bmatrix} \sqrt{2} & -1 & 0 \\ 0 & 1 & 0 \\ 0 & 0 & 1 \end{bmatrix} \begin{bmatrix} \frac{1}{\sqrt{2}} & 0 & 0 \\ 0 & 1 & 0 \\ 0 & 0 & \frac{1}{p} \end{bmatrix} \begin{bmatrix} 1 & 0 & 0 \\ 0 & 1 & 0 \\ 0 & 0 & 1 \end{bmatrix}$$

Even though A(p) is a square matrix, we use the term pseudo-inverse instead of inverse to keep the generality, because for p equal zero, the matrix A(p) is rank deficient and its inverse does not exist. According to the MMD theorem and corollary, when p=0, we replace the expression 1/p by zero in the expression of A$^+$. This leads to $$A^+ = \begin{bmatrix} 1 - 10 \\ 0 & 10 \\ 0 & 00 \end{bmatrix},$$

for p=0.

MMD AND ROBOTICS
Observation

For an n-link robot manipulator with a spherical wrist, the MMD of the robot jacobian matrix is unique if the choice of the column unit vectors of the matrix U is made such that the related columns vectors which span the range space of the jacobian matrix with the higher column number are chosen first. This choice is based on the fact that the columns of the jacobian matrix with the higher column number are in general computationally less complex then the lower numbered columns. This choice leads to a unique and more efficient computational formulations of the MMD of the robot jacobian matrix and the resulting jacobian pseudo-inverse matrix. More clarity about the above statements and observation will come through the following illustrative examples.

ROBOTICS EXAMPLE 1

Figure 4A:
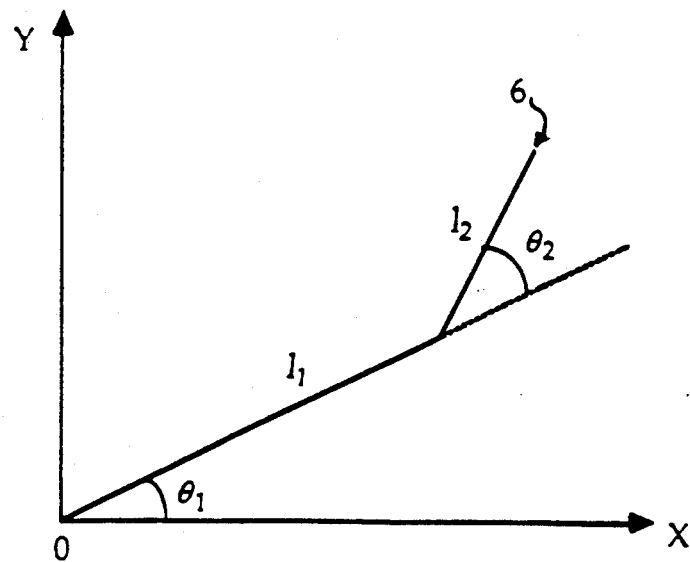
FIG. 4(a)-(b) are the graphical representations of the kinematic representation of respectively a planar two-link robot, and a planar four-link redundant robot.
Figure 4B:
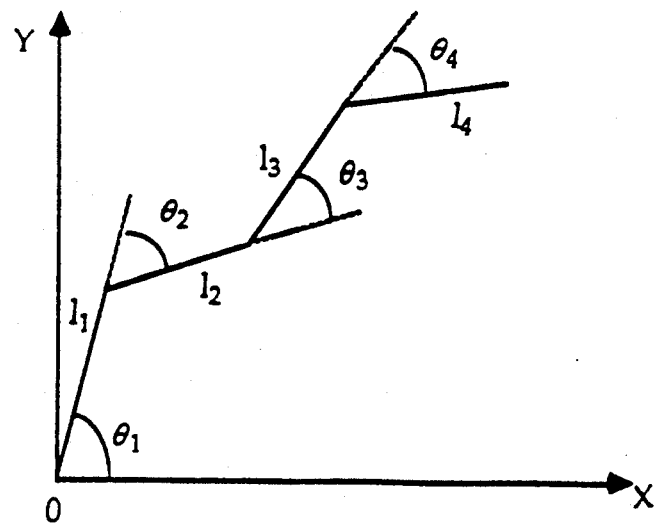

Case of a planar two-link robot shown in FIG. 4. If (x,y) is the Cartesian position of the hand of the robot 6, the forward kinematics equations are:

$$\begin{bmatrix} x \\ y \end{bmatrix} = \begin{bmatrix} l_1 c_1 + l_2 c_{12} \\ l_1 s_1 + l_2 s_{12} \end{bmatrix}$$

Where $s_{12} = \sin(\theta_1 + \theta_2)$, $C_1 = \cos(\theta_1)$, and $l_1$, $l_2$ are the lengths of the robot links. The robot jacobian matrix, noted $J(\theta)$, is defined as, $$J(\theta) = \begin{bmatrix} -l_1 s_1 - l_2 s_{12} & -l_2 s_{12} \\ l_1 c_1 + l_2 c_{12} & l_2 c_{12} \end{bmatrix}$$

The jacobian determinant is defined as $|J(\theta)| = -l_1 l_2 s_2$. For the robot configuration defined by $s_2 = 0$, the rank of the jacobian $J(\theta)$ drops from 2 to 1. This corresponds to the robot configurations where the links are collinear. To compute symbolically the pseudo-inverse of $J(\theta)$, according to the MMD algorithm, we need to construct an orthogonal basis $\{u_1, u_2\}$, such that $u_2$ is orthogonal to the range space of $J(\theta)$. When $s_2 = 0$, the columns of the matrix jacobian are linearly dependant and the range of the jacobian is spanned by either the first or the second column vector. In light of the above observation, we choose the higher numbered column i.e., the second column vector as being the vector which spans the range space of the matrix jacobian. Hence the unique choice of the vectors $u_1, u_2$ is, $$u_2 = \begin{bmatrix} -c_{12} \\ -s_2 \end{bmatrix}, \text{ and } u_1 = \begin{bmatrix} -s_{12} \\ c_{12} \end{bmatrix}.$$

Following the steps of the MMD algorithm 1 we obtain, $$J^T u_2 = \begin{bmatrix} -l_1 s_2 \\ 0 \end{bmatrix}$$

$$J^T u_1 = \begin{bmatrix} l_1 c_2 + l_2 \\ l_2 \end{bmatrix}$$

The MMD of the robot jacobian is then, $$J(\theta) = \begin{bmatrix} -s_{12} & -c_{12} \\ c_{12} & -s_{12} \end{bmatrix} \begin{bmatrix} w_1 & 0 \\ 0 & w_2 \end{bmatrix} \begin{bmatrix} \frac{l_1 c_2 + l_2}{w_1} & \frac{l_2}{w_1} \\ \delta & 0 \end{bmatrix}$$

Where $w_1=\sqrt{l_2^2+(l_1c_2+l_2)^2}$, and $w_2=|l_1s_2|$, are by definition the MMD diagonal values of the robot jacobian, and where $\delta$ is defined as, $$\delta = \begin{cases} 1 & \text{if } s_2 < 0 \\ -1 & \text{if } s_2 \geq 0 \end{cases}$$

The MMD-based pseudo-inverse of $J(\theta)$ is then given by, $$J^+(\theta) = \begin{bmatrix} 0 & \delta \\ \dfrac{w_1}{l_2} & \dfrac{-\delta(l_1c_2+l_2)}{l_2} \end{bmatrix} \begin{bmatrix} \dfrac{1}{w_1} & 0 \\ 0 & \dfrac{1}{w_2} \end{bmatrix} \begin{bmatrix} -s_{12} & c_{12} \\ -c_{12} & -s_{12} \end{bmatrix}$$

According to the MMD theorem and corollary, when the robot jacobian is rank deficient (i.e., $s_2=0$), the matrix jacobian pseudo-inverse is obtained by replacing $1/w_2$ by zero, i.e., $$J^+(\theta) = V_1(V_1^T V_1)^{-1} W_0^{-1} U_1^T = \begin{bmatrix} \dfrac{l_1c_2+l_2}{w_1} \\ \dfrac{l_2}{w_1} \end{bmatrix} \dfrac{1}{w_1} [-s_{12}\ c_{12}]$$

$$= \begin{bmatrix} -\dfrac{(l_1c_2+l_2)s_{12}}{w_1^2} & \dfrac{(l_1c_2+l_2)c_{12}}{w_1^2} \\ -\dfrac{l_2 s_{12}}{w_1^2} & \dfrac{l_2 c_{12}}{w_1^2} \end{bmatrix}$$

ROBOTICS EXAMPLE 2

Case of planar redundant 4-link robot shown in FIG. 4. The forward kinematics equations are:

$$\begin{bmatrix} x \\ y \end{bmatrix} = \begin{bmatrix} l_1c_1 + l_2c_{12} + l_3c_{123} + l_4c_{1234} \\ l_1s_1 + l_2s_{12} + l_3s_{123} + l_4s_{1234} \end{bmatrix}$$

Where $l_1, l_2, l_3, l_4$ are the lengths of the robot links. The robot jacobian may be written as, $$J(\theta) = J(\theta) \begin{bmatrix} 1000 \\ 1100 \\ 1110 \\ 1111 \end{bmatrix}$$

Where $\bar{J}(\theta)$ is defined as, $$\bar{J}(\theta) = \begin{bmatrix} -l_1s_1-l_2s_{12}-l_3s_{123}-l_4s_{1234} \\ l_1c_1\ \ l_2c_{12}\ \ l_3c_{123}\ \ l_4c_{1234} \end{bmatrix}$$

We consider the MMD of the left hand matrix $\bar{J}(\theta)$. To determine the MMD of the matrix $\bar{J}(\theta)$, according to the MMD algorithm, we need to construct an orthogonal basis $\{u_1, u_2\}$, such that $u_2$ is orthogonal to the range space of $\bar{J}(\theta)$. We choose, based on the above observation, $$u_2 = \begin{bmatrix} -c_{1234} \\ -s_{1234} \end{bmatrix}, \text{ and } u_1 = \begin{bmatrix} -s_{1234} \\ c_{1234} \end{bmatrix}.$$

According to the MMD algorithm, $$\bar{J}^T(\theta)u_1 = \begin{bmatrix} l_1c_{234} \\ l_2c_{34} \\ l_3c_4 \\ l_4 \end{bmatrix}$$

$$\bar{J}^T(\theta)u_2 = \begin{bmatrix} -l_1s_{234} \\ -l_2s_{34} \\ -l_3s_4 \\ 0 \end{bmatrix}$$

The MMD of $\bar{J}(\theta)$ is then given by, $$\bar{J}(\theta) = \begin{bmatrix} -s_{1234} & -c_{1234} \\ c_{1234} & -s_{1234} \end{bmatrix} \begin{bmatrix} w_1 & 0 \\ 0 & w_2 \end{bmatrix} \begin{bmatrix} \dfrac{l_1c_{234}}{w_1} & \dfrac{l_2c_{34}}{w_1} & \dfrac{l_3c_4}{w_1} & \dfrac{l_4}{w_1} \\ -\dfrac{l_1s_{234}}{w_2} & -\dfrac{l_2s_{34}}{w_2} & -\dfrac{l_3s_4}{w_2} & 0 \end{bmatrix}$$

Where the MMD diagonal values of the matrix $\bar{J}(\theta)$ are $w_1=\sqrt{l_4^2+l_1^2c_{234}^2+l_2^2c_{34}^2+l_3^2c_4^2}$, and $w_2=\sqrt{l_1^2s_{234}^2+l_2^2s_{34}^2+l_3^2s_4^2}$

ROBOTICS EXAMPLE 3

Figure 1B:
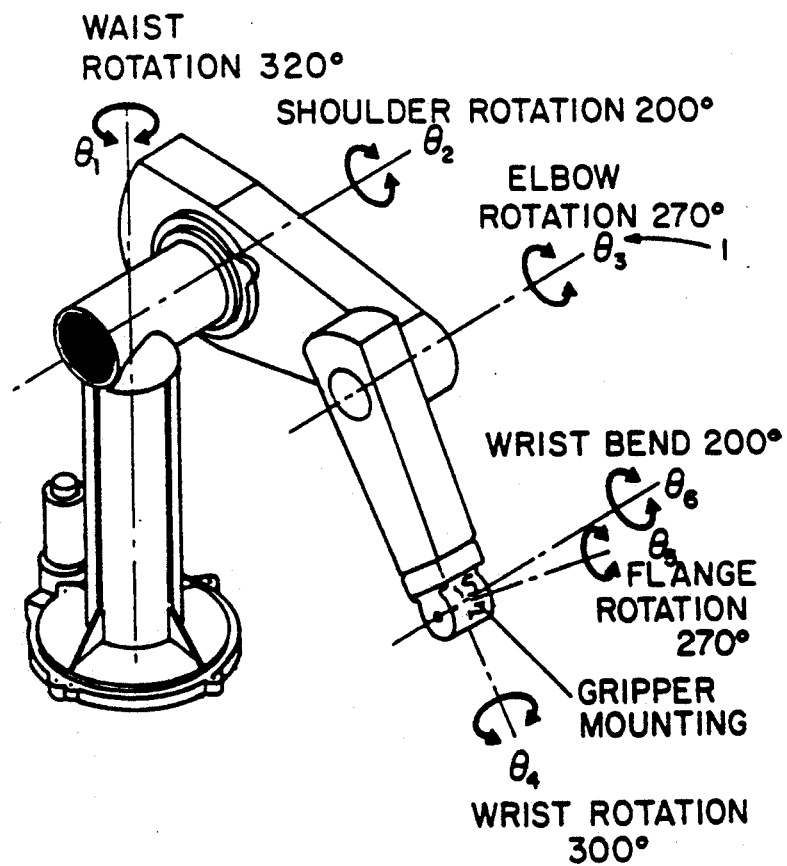
Figure 1C:
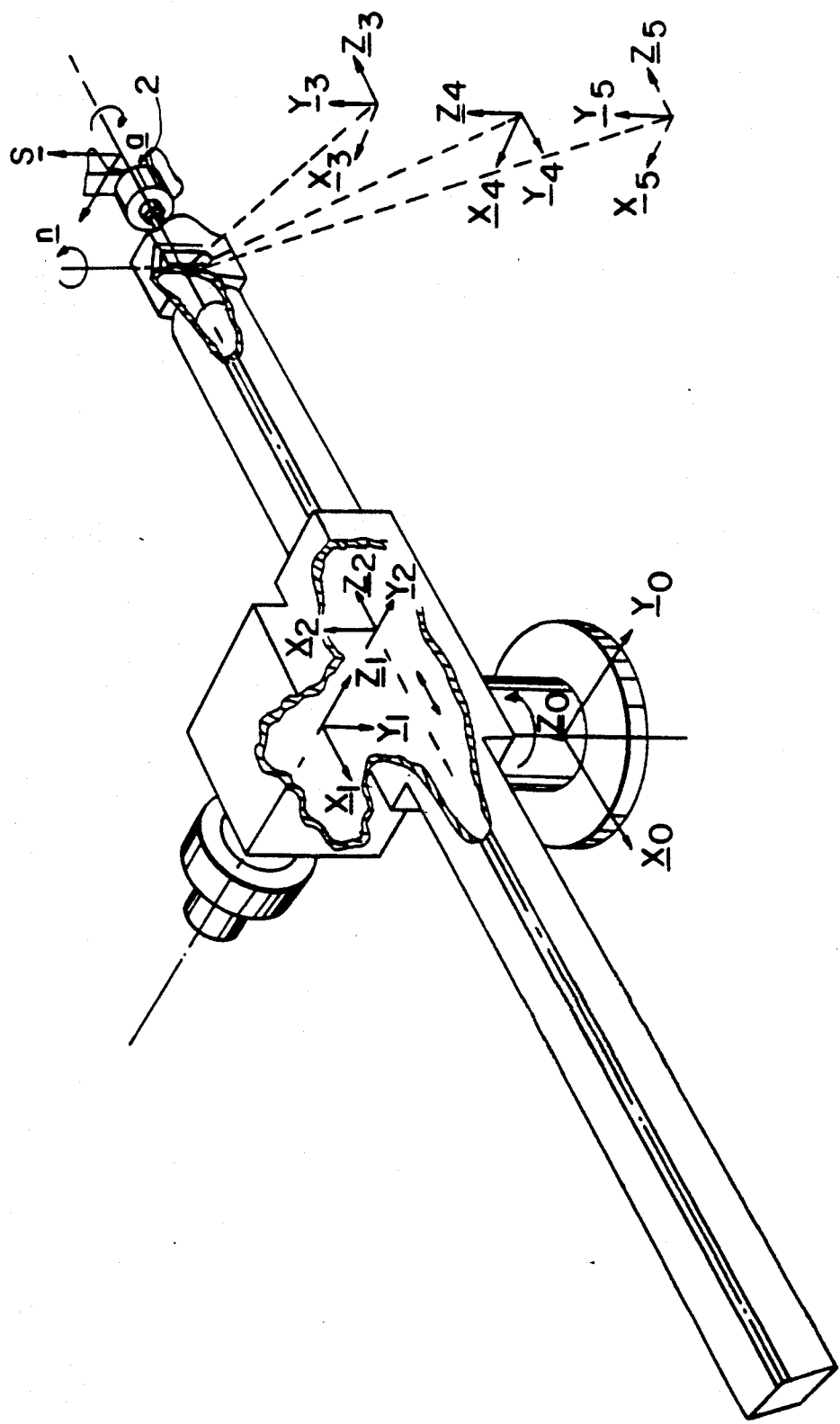

Case of a 3-dimensional robot: the Stanford arm shown in FIG. 1, which is a 6-degree-of-freedom robot manipulator with a spherical wrist. The 6×6 jacobian matrix, in the case of the Stanford arm, can be written as, $$J(\theta) = \begin{bmatrix} J_p & 0 \\ J_\sigma & R_0^3 J_o \end{bmatrix}$$

Where $R_0^3, J_p, J_\sigma, J_o$ are 3×3 matrices. The matrix $R_0^3$ is a rotation matrix, and the matrices $J_p$, and $J_o$ are referred to respectively as the wrist position jacobian matrix and the wrist orientation jacobian matrix. Since the inversion of the above 6×6 jacobian matrix $J(\theta)$ is given by, $$J^{-1}(\theta) = \begin{bmatrix} J_p^{-1} & 0 \\ -J_o^{-1} R_0^{3T} J_\sigma^{-1} J_o^{-1} & J_o^{-1} R_0^{3T} \end{bmatrix}$$

we will consider only the MMD of the wrist position and orientation jacobian matrices $J_p$, and $J_o$. For the Stanford manipulator the matrices $J_p$ and $J_o$ can be defined respectively as, $$J_p(\theta) = \begin{bmatrix} -fs_1s_2 - rc_1 & fc_1c_2 & c_1s_2 \\ fc_1s_2 - rs_1 & fs_1c_2 & s_1s_2 \\ 0 & -fs_2 & c_2 \end{bmatrix}, \text{ and}$$

$$J_o(\theta) = \begin{bmatrix} 0 & -s_4 & c_4s_5 \\ 0 & c_4 & s_4s_5 \\ 1 & 0 & c_5 \end{bmatrix}.$$

Where $(\theta_1, \theta_2, f, \theta_4, \theta_5)$ are the first five joint variables of the robot, and r is a length parameter related to the second robot link.

THE MMD OF THE MATRIX $J_p$

The determinant of the matrix $J_p$ is $|J_p| = -f^2 s_2$. For $s_2 = 0$ the matrix $J_p$ is of rank 2 and its range is spanned by either the first and third columns or the second and third columns of the matrix $J_p$. In light of the observation made at the beginning of the section MMD and robotics, the choice of the related third and second column vectors of the matrix $J_p$, (i.e., column vectors with the higher column numbers), as being the column vectors which span the range space of the matrix $J_p$ will lead to a unique and more efficient computational formulations of the MMD of the matrix $J_p$. Based on the foregoing the vector $u_3$ is chosen to be the unit vector which is orthogonal to the third and second columns of $J_p$. The vectors $u_1, u_2, u_3$ are then given by, $$u_3 = L^3(a_3^3, a_2^3) = \begin{bmatrix} -s_1 \\ c_1 \\ 0 \end{bmatrix}$$

$$u_2 = L^3(a_3^3, u_3) = \begin{bmatrix} -c_2 c_1 \\ -c_2 s_1 \\ s_2 \end{bmatrix}$$

$$u_1 = a_3^3 = \begin{bmatrix} c_1 s_2 \\ s_1 s_2 \\ c_2 \end{bmatrix}$$

Where $a_3^3$ and $a_2^3$ are unit vectors which are respectively in the direction of the third and second column vector of the matrix $J_p$. Following the steps of the MMD algorithms we obtain, $$J_p^T(\theta) u_1 = \begin{bmatrix} -rs_2 \\ 0 \\ 1 \end{bmatrix}$$

$$J_p^T(\theta) u_2 = \begin{bmatrix} rc_2 \\ -f \\ 0 \end{bmatrix}$$

$$J_p^T(\theta) u_3 = \begin{bmatrix} fs_2 \\ 0 \\ 0 \end{bmatrix}$$

The MMD of the wrist position jacobian matrix $J_p$ is then given by, $$J_p(\theta) =$$

$$\begin{bmatrix} c_1 s_2 & -c_2 c_1 & -s_1 \\ s_1 s_2 & -c_2 s_1 & c_2 \\ c_1 & s_2 & 0 \end{bmatrix} \begin{bmatrix} w_1 & 0 & 0 \\ 0 & w_2 & 0 \\ 0 & 0 & w_3 \end{bmatrix} \begin{bmatrix} \dfrac{-rs_2}{w_1} & 0 & \dfrac{1}{w_1} \\ \dfrac{rc_2}{w_2} & -\dfrac{f}{w_2} & 0 \\ \delta & 0 & 0 \end{bmatrix}$$

Where the MMD diagonal values are $w_1 = \sqrt{r^2 s_2^2 + 1}$, $w_2 = \sqrt{f^2 + r^2 c_2^2}$, $w_3 = |fs_2|$.

$$\delta = \begin{cases} 1 & \text{if } s_2 \geq 0 \\ -1 & \text{if } s_2 < 0 \end{cases}$$

THE MMD OF THE MATRIX $J_o$

The determinant of the matrix $J_o$ is $|J_o| = -s_5$. When $s_5 = 0$, the matrix $J_o$ is of rank 2 and the range space of the matrix $J_o$ is spanned by the second and third column vectors of the matrix $J_o$. Accordingly, we choose the vectors $u_1, u_2, u_3$ as, $$u_3 = L^3(a_3^3, a_2^3) = \begin{bmatrix} -c_4 c_5 \\ -s_4 c_5 \\ s_5 \end{bmatrix}$$

$$u_2 = L^3(a_3^3, u_3) = \begin{bmatrix} s_4 \\ -c_4 \\ 0 \end{bmatrix}$$

$$u_1 = a_3^3 = \begin{bmatrix} c_4 s_5 \\ s_4 s_5 \\ c_5 \end{bmatrix}$$

where $a_3^3$, and $a_2^3$ are unit vectors which are respectively in the direction of the third and second column vector of the matrix $J_o$.

$$J_o^T u_1 = \begin{bmatrix} c_5 \\ 0 \\ 1 \end{bmatrix}$$

$$J_o^T u_2 = \begin{bmatrix} 0 \\ 1 \\ 0 \end{bmatrix}$$

$$J_o^T u_3 = \begin{bmatrix} s_5 \\ 0 \\ 0 \end{bmatrix}$$

The MMD of the wrist orientation jacobian matrix $J_o$ is then given by, $$J_o(\theta) = \begin{bmatrix} c_4s_5 & s_4 & -c_4c_5 \\ s_4s_5 & -c_4 & -s_4c_5 \\ c_5 & 0 & s_5 \end{bmatrix} \begin{bmatrix} w_1 & 0 & 0 \\ 0 & w_2 & 0 \\ 0 & 0 & w_3 \end{bmatrix} \begin{bmatrix} \frac{c_5}{w_1} & 0 & \frac{1}{w_1} \\ 0 & 1 & 0 \\ \delta & 0 & 0 \end{bmatrix}$$

Where the MMD diagonal values of wrist orientation jacobian matrix are $w_1 = \sqrt{c_5^2 + 1}$, $w_2 = 1$, and $w_3 = |s_5|$; $\delta$ is defined as, $$\delta = \begin{cases} 1 & \text{if } s_5 \geq 0 \\ -1 & \text{if } s_5 < 0 \end{cases}$$

ROBOTICS EXAMPLE 4

Case of the Unimation Puma 560 shown in FIG.-1: a six-degree-of-freedom robot with a spherical wrist. As with the Stanford arm the 6×6 jacobian matrix $J(\theta)$ can be written as, $$J(\theta) = \begin{bmatrix} J_p & 0 \\ J_o^3 & R_0^3 J_o \end{bmatrix}$$

where the matrices $J_p$ and $J_o$ can respectively be defined for the Puma robot as, $$J_p(\theta) = \begin{bmatrix} fs_1s_{23} - es_1c_2 - gc_1 & -fc_1c_{23} - ec_1s_2 & -fc_1c_{23} \\ -fc_1s_{23} + ec_1c_2 - gs_1 & -fs_1c_{23} - es_1s_2 & -fc_1c_{23} \\ 0 & fs_{23} - ec_2 & fs_{23} \end{bmatrix},$$

and $$J_o(\theta) = \begin{bmatrix} 0 & -s_4 & c_4s_5 \\ 1 & 0 & c_5 \\ 0 & -c_4 & -s_4s_5 \end{bmatrix},$$

where ($\theta_1$, $\theta_2$, $\theta_3$, $\theta_4$, $\theta_5$) are the five first robot joint coordinates, and where f and e are length parameters related to the second and third robot links.

We may notice that it is not necessary to rederive the MMD of the wrist orientation matrix, $J_o$, for this example since the orientation matrices in this example and the last example can be derived from each other by matrix row permutations. Hence only the MMD of the wrist position jacobian $J_p$ will be considered. As we have covered the three first robotics examples in details, for this example, without going into the final details we will give only the important step of choosing the orthonormal basis $\{u_1, u_2, u_3\}$. The determinant of the matrix $J_p$ is defined as $|J_p| = efc_3(ec_2 - fs_{23})$. In the case of the Puma robot the rank of the wrist position jacobian matrix $J_p$ can be 3, 2, or 1, depending on the robot joint configuration. For $c_3 = 0$ or $ec_2 - fs_{23} = 0$, the position jacobian matrix $J_p$ is of rank 2 and its range space is spanned by the third and first columns vectors. For $c_3 = 0$ and $ec_2 - fs_{23} = 0$, the position jacobian matrix is of rank 1 and its range space is spanned by the third column vector. According to the MMD algorithm we need to construct an orthonormal basis $\{u_1, u_2, u_3\}$ such that $u_3$ is orthogonal to the range space of $J_p$ when the rank of $J_p$ is 2, and such that $u_3$ and $u_2$ are orthogonal to the range space of $J_p$ when the rank of $J_p$ is 1. We choose, $$u_3 = L^3(a_3^3, a_1^3)$$

$$u_2 = L^3(a_3^3, u_3)$$

$$u_1 = a_3^3$$

where $a_3^3$, and $a_1^3$ are unit vectors which are respectively in the direction of the third and first column vector of the matrix $J_p$. With the above choice for the orthonormal basis $u_1$, $u_2$, $u_3$ the resulting MMD diagonal values $w_1$, $w_2$, and $w_3$ are such that when the rank of the matrix, $J_p$, drops from 3 to 1 (i.e., either when $c_3 = 0$ or when $ec_2 - fs_{23} = 0$) the MMD diagonal value $w_3$ goes to zero, and such that when the rank of the matrix $J_p$ drops from 2 to 1 (i.e., when $c_3 = 0$ and $ec_2 - fs_{23} = 0$), both the MMD diagonal values $w_2$ and $w_3$ go to zero.

COMPUTER METHOD AND IMPLEMENTATION ON A DIGITAL COMPUTER

Figure 2A:
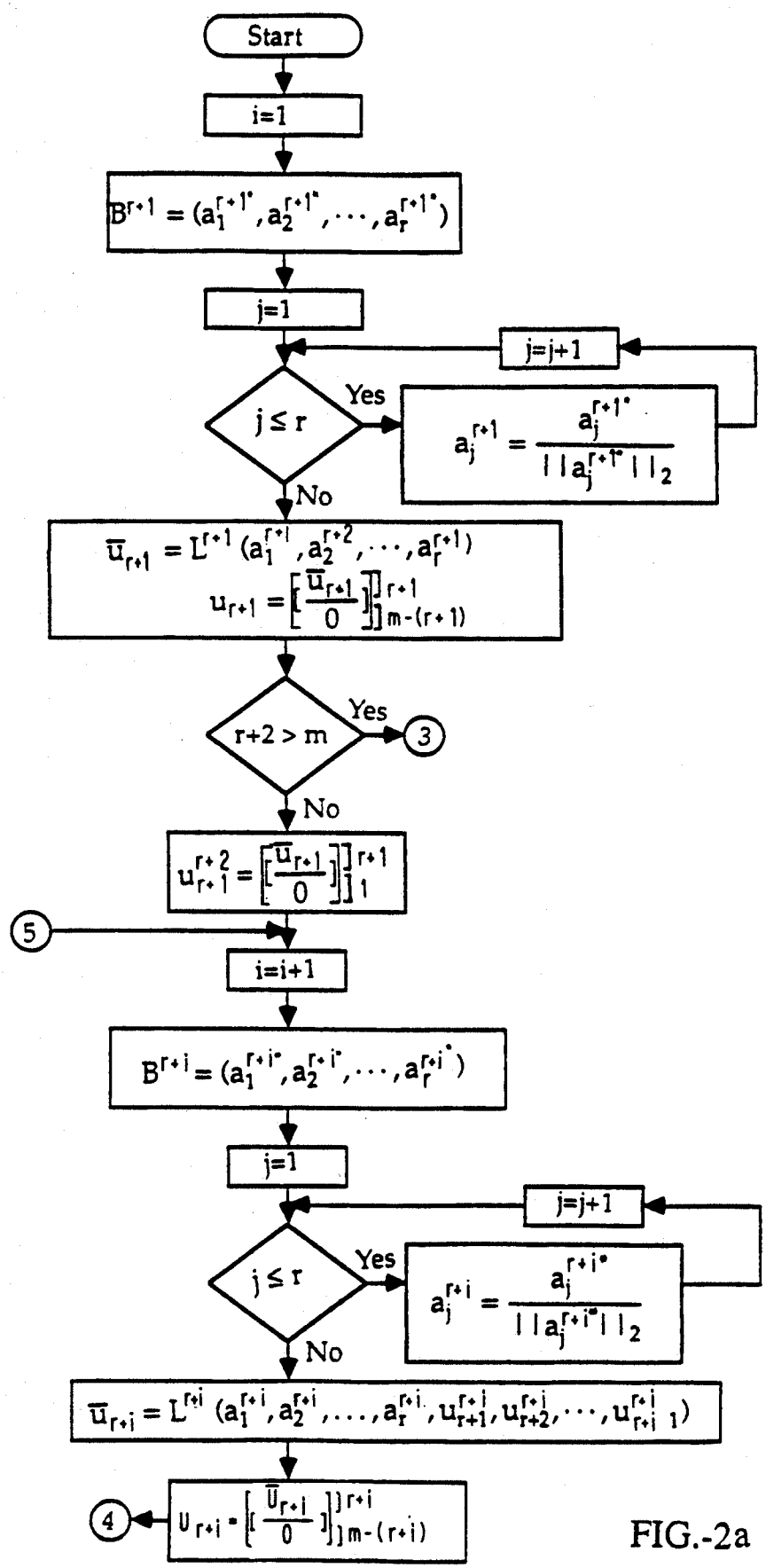
Figure 2B:
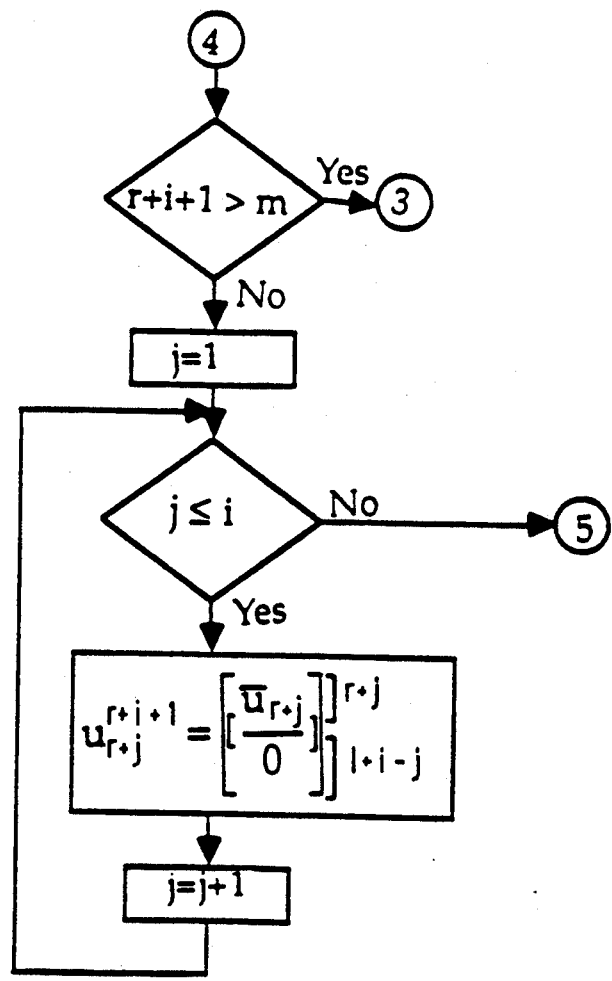
Figure 3:
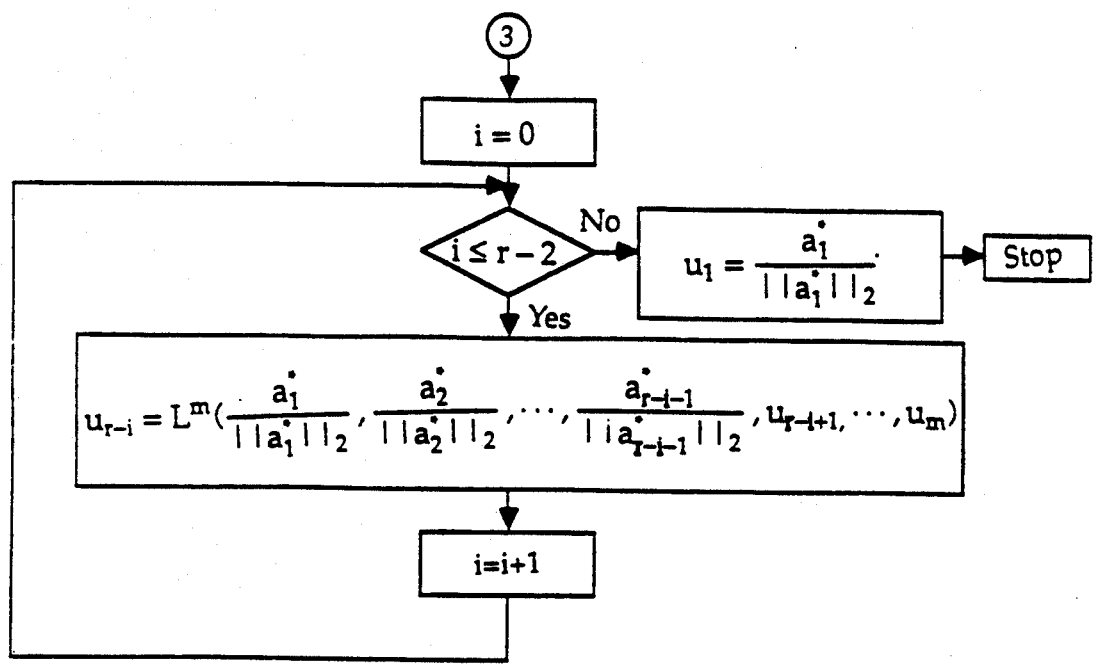

The problem of programming a computer to perform the analytical steps of the pseudo-inverse obtained by using the MMD algorithm outlined is flow charts of FIG.-2 and FIG.-3, leads in a natural way to questions concerning the stability of the divisors $\{w_i i = 1, 2, \ldots, i\}$ of the diagonal matrix W, i.e., the MMD diagonal values. The emphasis in this section will be on numerical considerations pertinent to the implementation of the analytical steps on a digital computer. Explicit considerations of round-off errors, overflow as well as treatment of the numerical stability is done. Analytically a matrix is either rank deficient or not. Unfortunately, this is not true numerically, and because of the finite precision nature of any computing machine, the implementation on a digital computer involves issues of computational problem overflow caused by the instability of the divisors $\{w_i i = 1, 2, \ldots, m\}$ when one or more of the MMD diagonal values $w_i$ become small. In accordance with the preferred embodiment of the present invention, this happens when the jacobian becomes ill conditioned (near or at a singularity).

The problem is to intelligently decide when a MMD diagonal value of the set $\{w_i i = 1, 2, \ldots, m\}$ is neglectable such that its reciprocal $\{1/w_i i = 1, 2, \ldots, m\}$ in the expression of the MMD-based pseudo-inverse can be replaced by zero, in other words, the outstanding problem of deciding when a matrix becomes ill conditioned. The determination of the ill condition or the rank deficiency of a matrix numerically, is a highly nontrivial problem. It is well known from linear algebra that a matrix is ill conditioned if its condition number (ratio $\sigma_1/\sigma_m$, between the maximum and minimum of its singular values) is too large, that is, if its reciprocal approaches the machine floating point precision. Unfortunately, it is also well known that the numerical evaluations of the singular values of a matrix can be done only numerically and are very costly computationally.

Therefore, a need for a more efficient measure of the "nearness of a matrix to rank deficiency", is required, a new measure which is stable and computationally efficient. To determine the condition of a matrix, the computer method presented in this invention, and which will be described hereafter, is based on the following measure of the "nearness of a matrix to rank deficiency" of an m×n matrix $A(\theta)$, noted $k(\theta)$, and defined as, $$k(\theta) = \frac{w_m(\theta)}{w_1(\theta)}$$

Where, $w_m(\theta)$ and $w_1(\theta)$ are respectively the minimum and maximum MMD diagonal values of the matrix $A(\theta)$ given by the MMD algorithm. This choice of measure of the "nearness of a matrix to rank deficiency", is based on the third property stated in the section Mathematical derivation, which states that the ratio between the minimum and maximun singular values of a matrix is always lower or equal to the ratio between the minimum and maximum of its MMD diagonal values as given by the MMD algorithm. Therefore, if P denotes the floating point machine precision of a computing machine, —for example $P \approx 10^{-6}$ and $P \approx 10^{-12}$ are respectively the machine floating point single precision and machine floating point double precision on the VAX 780 computer; the choice of P may be dependant on the problem at hand—, then the reciprocal of the condition number of a matrix, $\sigma_m/\sigma_1$, is also lower or equal to P, i.e., $$\frac{\sigma_m}{\sigma_1} \leq \frac{w_m}{w_1} \leq P.$$

This implies that the above newly defined measure $k(\theta)$, is not only efficient computationally (symbolic), but also it gives a good measure of the "nearness of a matrix to rank deficiency".

For example, for the two link robot example considered in the section entitled MMD algorithm, the measure $k(\theta)$ of "nearness of the robot to singularity" is defined from the foregoing as $$k(\theta) = \frac{w_2}{w_1} = \frac{|l_1 s_2|}{\sqrt{l_2{}^2 + (l_1 c_2 + l_2)^2}}.$$

In robotics terms, this newly defined measure $k(\theta)$ can be considered as a new measure of the robot manipulability.

Figure 5:
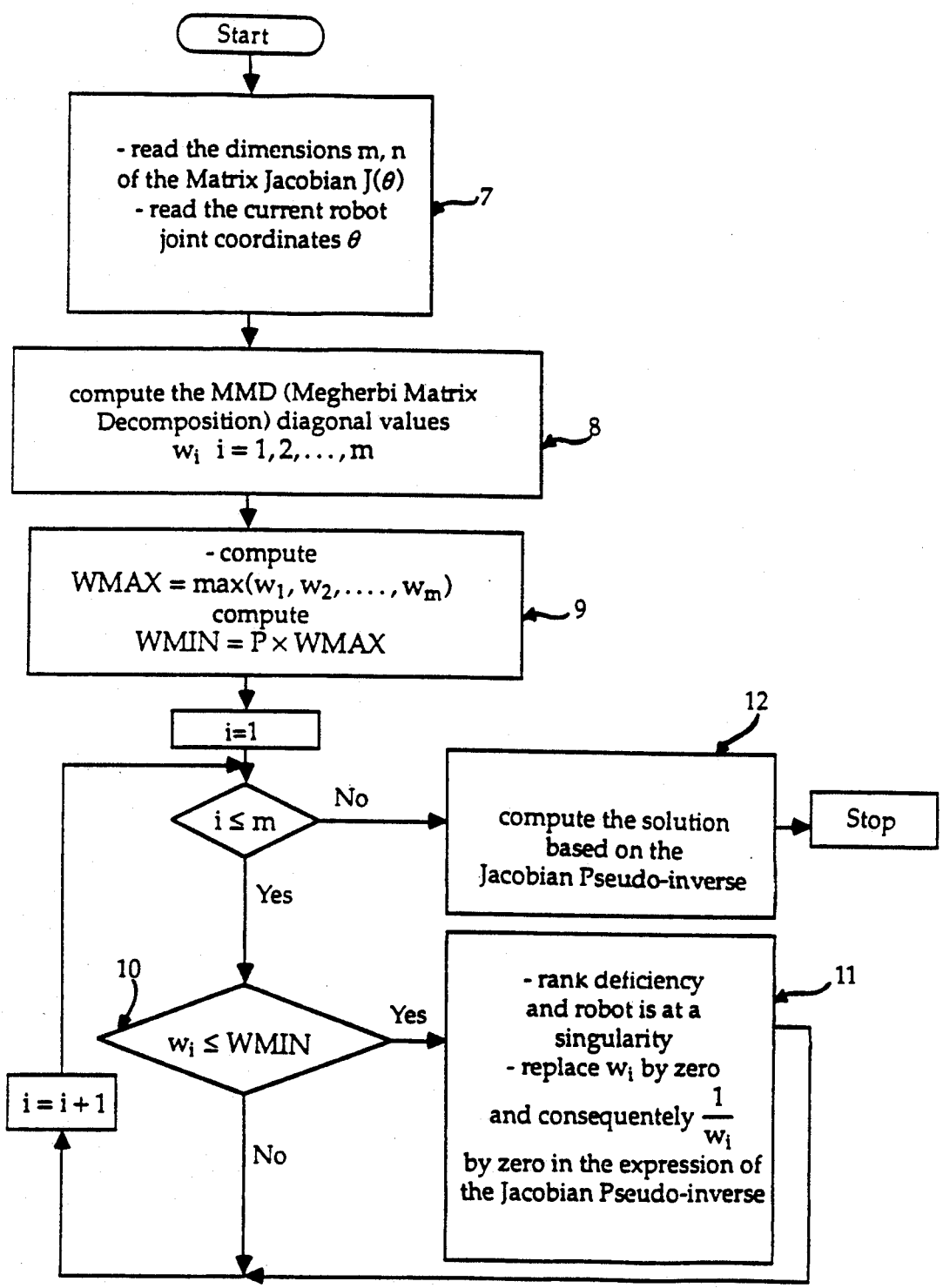

Based on the foregoing and according to the preferred embodiment of this present invention a, computer method to numerically perform and compute the symbolic MMD-based robot jacobian pseudo-inverse is shown and outlined in the flow chart of FIG.-5. First, it is necessary to read the dimensions m and n of the robot jacobian matrix as well as the current robot joint coordinates $\theta$ step 7. After numerical computation of the MMD diagonal values for the current robot joint coordinates $\theta$, step 8, the maximum MMD diagonal values, noted WMAX, is computed step 9. The variable WMIN is then defined as the product of the constant P by WMAX, i.e., P×WMAX, where P is the floating point single or double precision of the computing machine. To test intelligently the rank of the robot jacobian, each diagonal value $\{w_i \, i=1,2,\ldots,m\}$ is compared to WMIN, step 10. If one or more of the MMD diagonal values $\{w_i \, i=1,2,\ldots,m\}$ is lower or equal to WMIN then the robot is near or at a singularity, and the jacobian is ill conditioned. To maintain stability of the algorithm and avoid machine overflow the expression $1/w_i$ in the pseudo-inverse, corresponding to $w_i \leq \text{WMIN}$, is then replaced by zero, step 11. The more diagonal values $\{w_i \, i=1,2,\ldots,m\}$ are tested to be neglectable in comparison to WMIN, the more degenerate the jacobian is.

The stability of the divisors $$\left\{ \frac{1}{w_i} \, i = 1, 2, \ldots, m \right\}$$

being insured, the solution based on pseudo-inverse is then computed, step 12. In the case of robotics, when one of the diagonal values are neglectable in the sense that they are smaller than WMIN, this means that the motion of the robot is made possible in all directions $u_i$, which are columns of U whose same numbered element $w_i$ are non-zero, except in the direction $u_j$ whose same numbered element $w_j$ is neglectable. By replacing in the expression of the robot pseudo-inverse the divisor $1/w_j$ by zero, when $w_j$ is neglectable, we allow the robot to move only within allowed and physically possible directions that are within the range space of the robot jacobian. The main advantage of the computer method presented in this section are its computational efficiency (after symbolic reduction techniques) and its robustness vis a vis of singularities, as it will be shown through computer simulation examples in the next section entitled Preferred Embodiment.

PREFERRED EMBODIMENT

Figure 6:
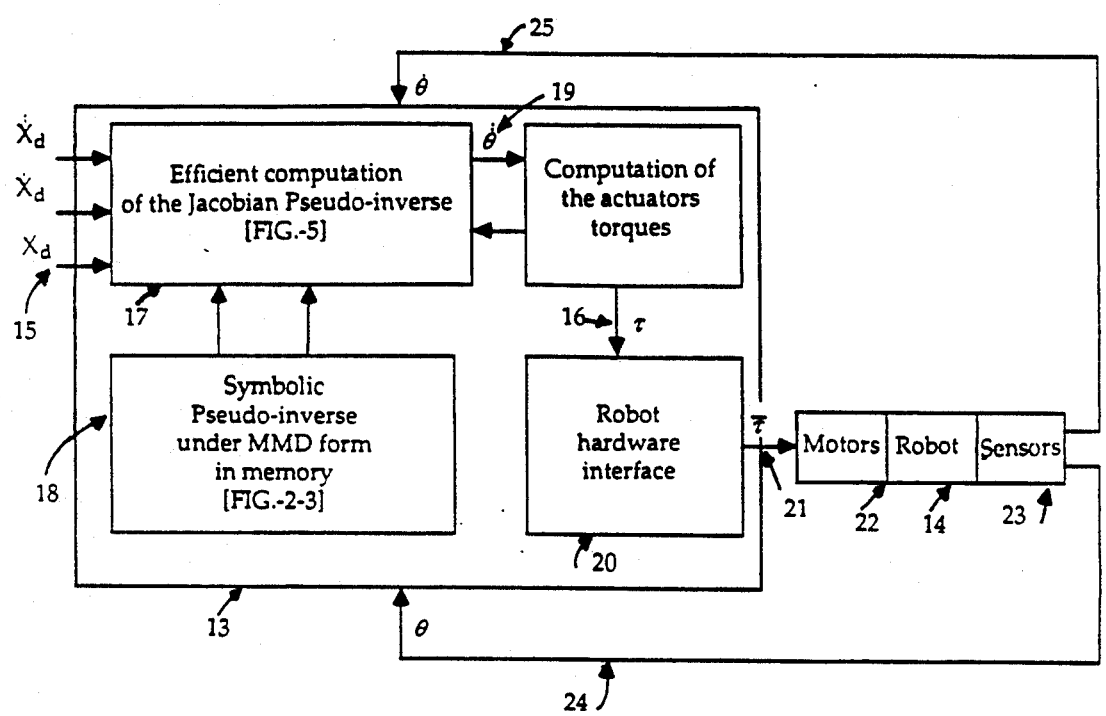
Figure 7:
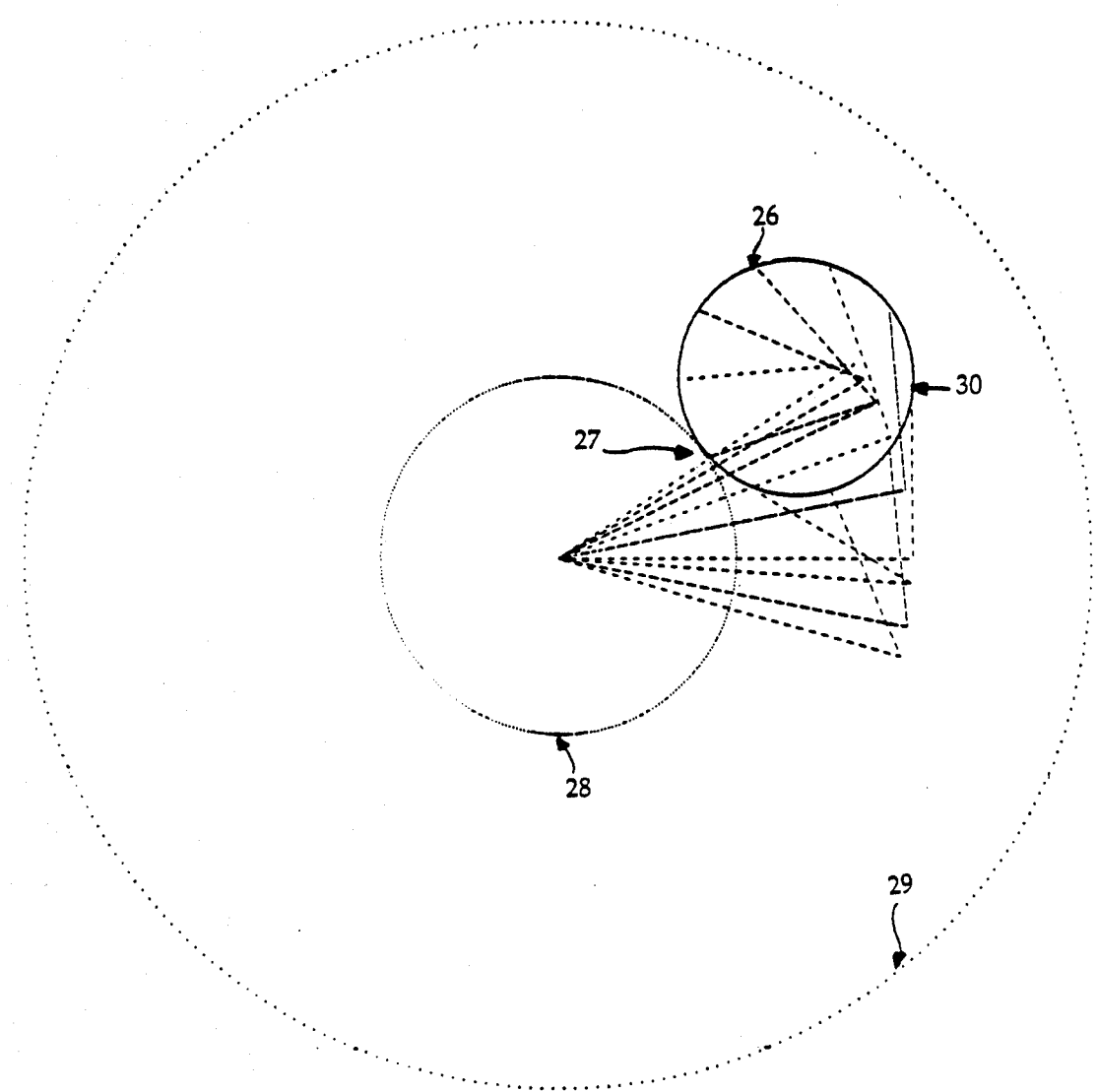

In FIG.-6, is an application system for utilizing the MMD to evaluate symbolically the robot pseudo-inverse using the process outlined in flow charts of FIG.-2 and FIG.-3, and a programmed digital computer 13 having stored therein the program which implements the computer method outlined in the flow charts of FIG.-5, to compute, efficiently and with stability, the robot jacobian pseudo-inverse matrix. This application consists of a computer-based process control 13, which controls a robot manipulator 14. The desired commanded Cartesian trajectory 15, which consists of the desired end effector cartesian position/orientation, $x_d$, velocity, $\dot{x}_d$, and acceleralation $\ddot{x}_d$, may be for example the output of a higher level hierarchy trajectory planner, getting inputs from a vision camera or other types of sophisticated sensory feedback.

To control the robot 14 to move along the commanded input trajectory 15, it is required to compute the torques and forces $\tau$, 16, needed to drive all the joints simultaneously with coordination and at different joint rates in order for the end effector to achieve the desired cartesian commanded input trajectory 15. To achieve that the inverse kinematics at the accelerator level must be solved. For that, the input data 15 are input to the pseudo-inverse computer 17 which carries out the process summarized in the flow chart of FIG. 5. The pseudo-inverse computer 17 reads inputs from memory 18, where the symbolic pseudo-inverse is stored. The process outlined in FIG. 2, and FIG. 3 is done off-line to determine the symbolic pseudo-inverse of the jacobian; after using symbolic reduction techniques, the efficient and exact symbolic computational formulation of the pseudo-inverse is stored in memory 18, to be used by the pseudo-inverse computer 17. The resulting joint acceleration $\ddot{\theta}$, 19, is used with the robot dynamics based equations of motion to compute the actuators torques and forces, 16. The computed torques and forces $\tau$, 16, are then sent to the hardwired circuit, 20, designed to interface with the robot hardware. The outputs of the circuit 20, are applied to the robot link actuators motors 22. Physical sensors, 23, mounted on the individual robot links to provide link joint position, 29, and joint velocity, 25 are continuously responsive to change in the actual current robot joint position and velocity. Those changes of the joint position and velocity are fed back to the robot controller, 13, which generates a position error signal which represents the difference between the desired and actual end effector position. This error signal is suitably used by the controller, 13, to compute the new correction torque that has to be sent to the robot in order to reduce to zero the deviation of the robot from the desired trajectory. This form of feedback control is very common in robotics, and the best known prior art technique is called "resolved acceleration and computed torque technique".

Robot control is a real time process whose output, 21, are applied to the motors, 22, as a sequence of set points which are spaced in time and separated by one sample period. The sampling period must be small enough to ensure a stable and smooth motion. The evaluation of the torques is computationally complex. Even though some well established methods to eliminate the restrictions of the computational complexity on the evaluation of the dynamics terms, which occur in the expressions of the equations of motions as stated in the articles by B. Armstrong, O. Khatib, and J. Burdick, "The explicit dynamic model and inertial parameters of the Puma 560 arm" in Proceedings of the IEEE International Conference on Robotics and Automation, San Francisco, Calif., April 1986, pp. 510-518, and by M. B. Leahy, Jr., L. M. Nugent, K. P. Valavanis, and G. N. Sarides, "Efficient Dynamics for a Puma-600" in Proceedings of the IEEE International Conference on Robotics and automation, San Francisco, Calif., April 1986, pp. 519-524, and their references, this evaluation has been limited by the additional requirements of efficient computations of the robot jacobian pseudo-inverse, specially when the jacobian becomes ill conditioned.

In some applications, using the arguments that the dynamic-based terms occurring in the robot equations of motion change less rapidly then the joint position, the dynamic based terms in the expression of the torques are performed periodically at a slower rate sampling frequency than the jacobian pseudo-inverse, which has to be computed in real time at the same rate as the joint servo rate to ensure the robot controller stability. Through this application example, we see that control computer of sophisticated anthropomorphic robots must contain provisions for efficient (real time) and stable (singularities) computation of the pseudo-inverse. It is the solution of this type of problem to which the present invention is directed. In accordance with the present invention, the deficiency of the prior art control techniques near singularities is overcome by using an entirely different strategy for efficient and stable computation of the robot pseudo-inverse based on the Megherbi Matrix Decomposition (MMD) algorithm and computer method. It is important to realize that a general or special purpose computer must be employed in order to physically implement the steps outlined in this section to control the robot.

Figure 11:
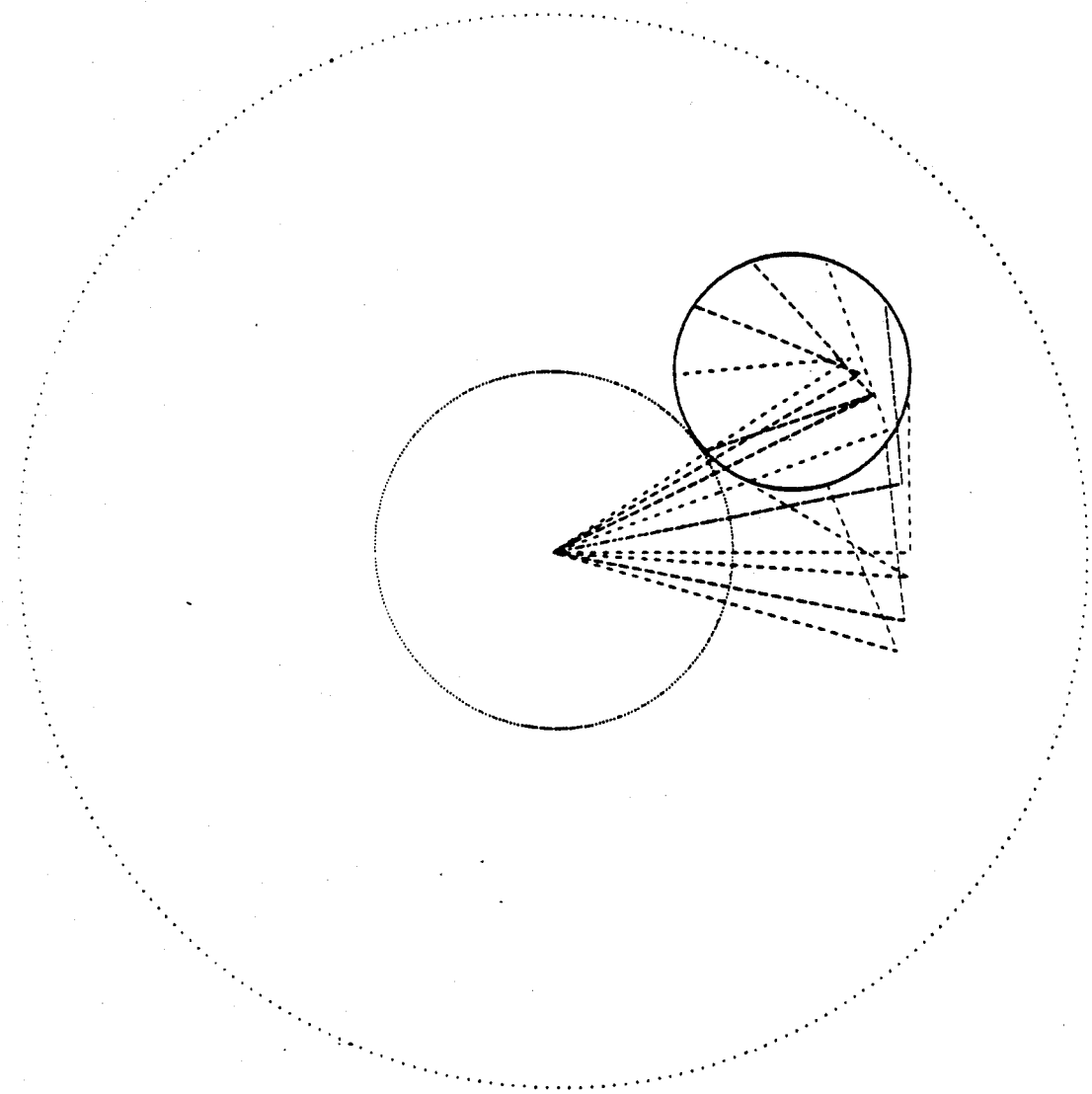
Figure 12:
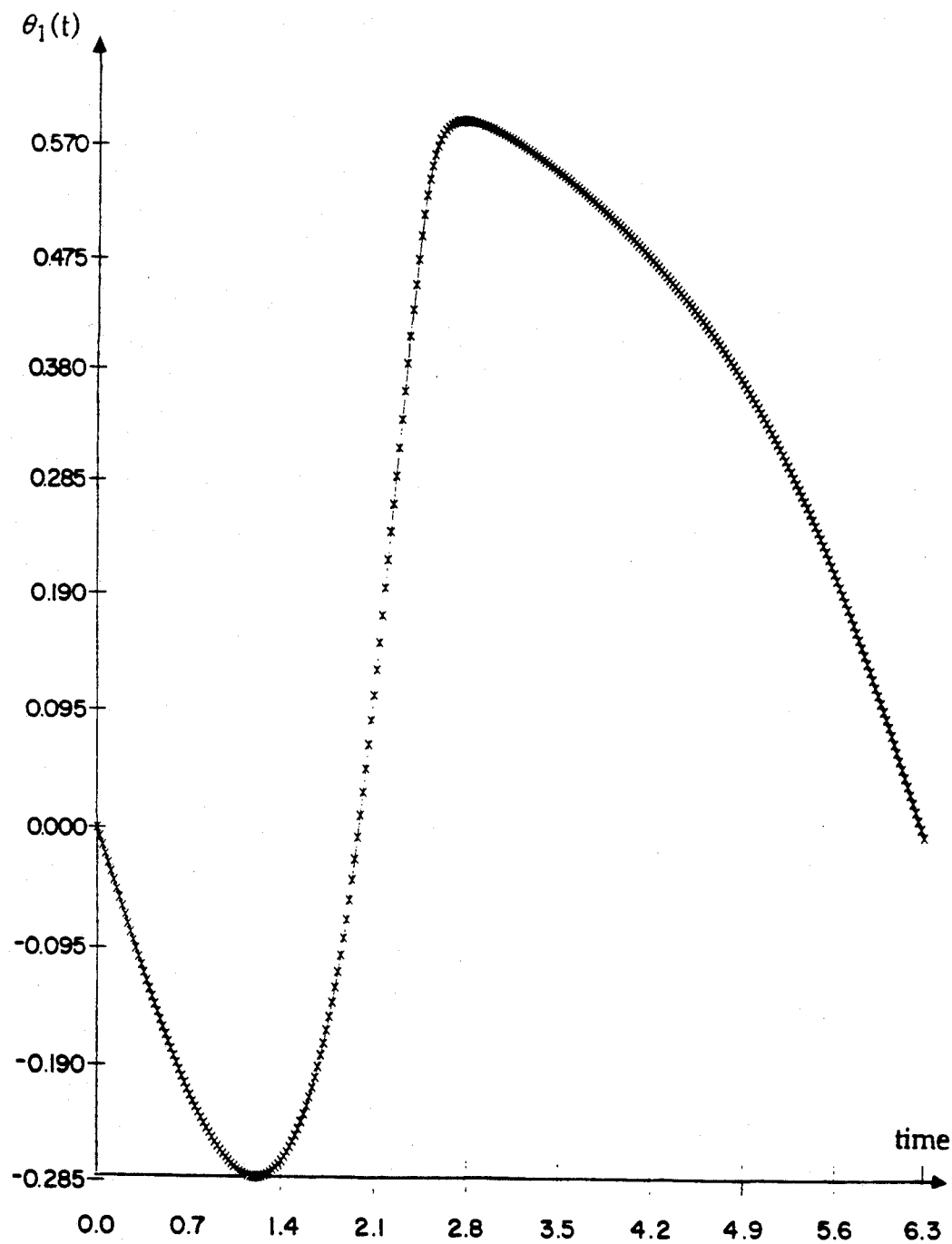
Figure 13:
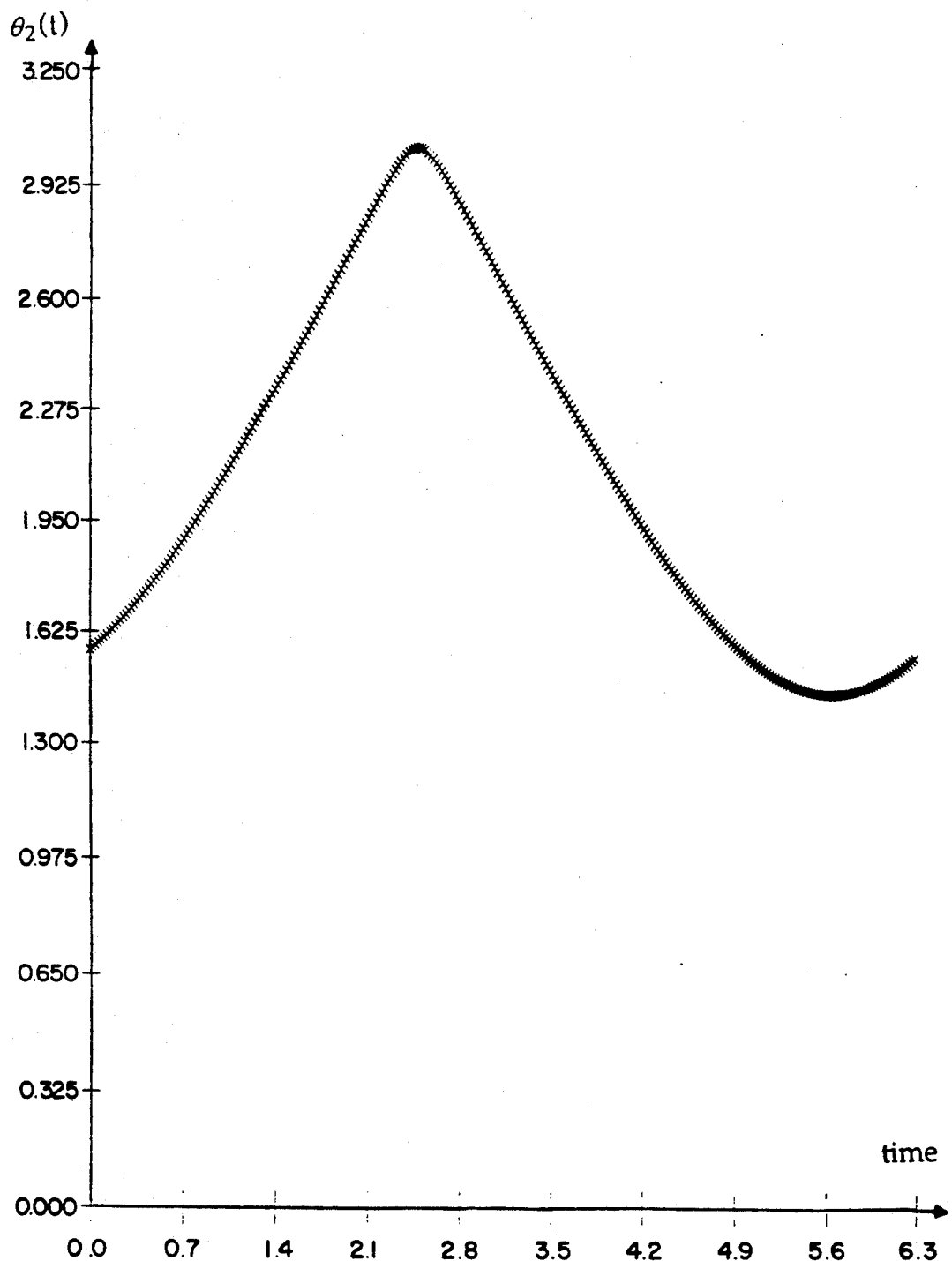
Figure 14:
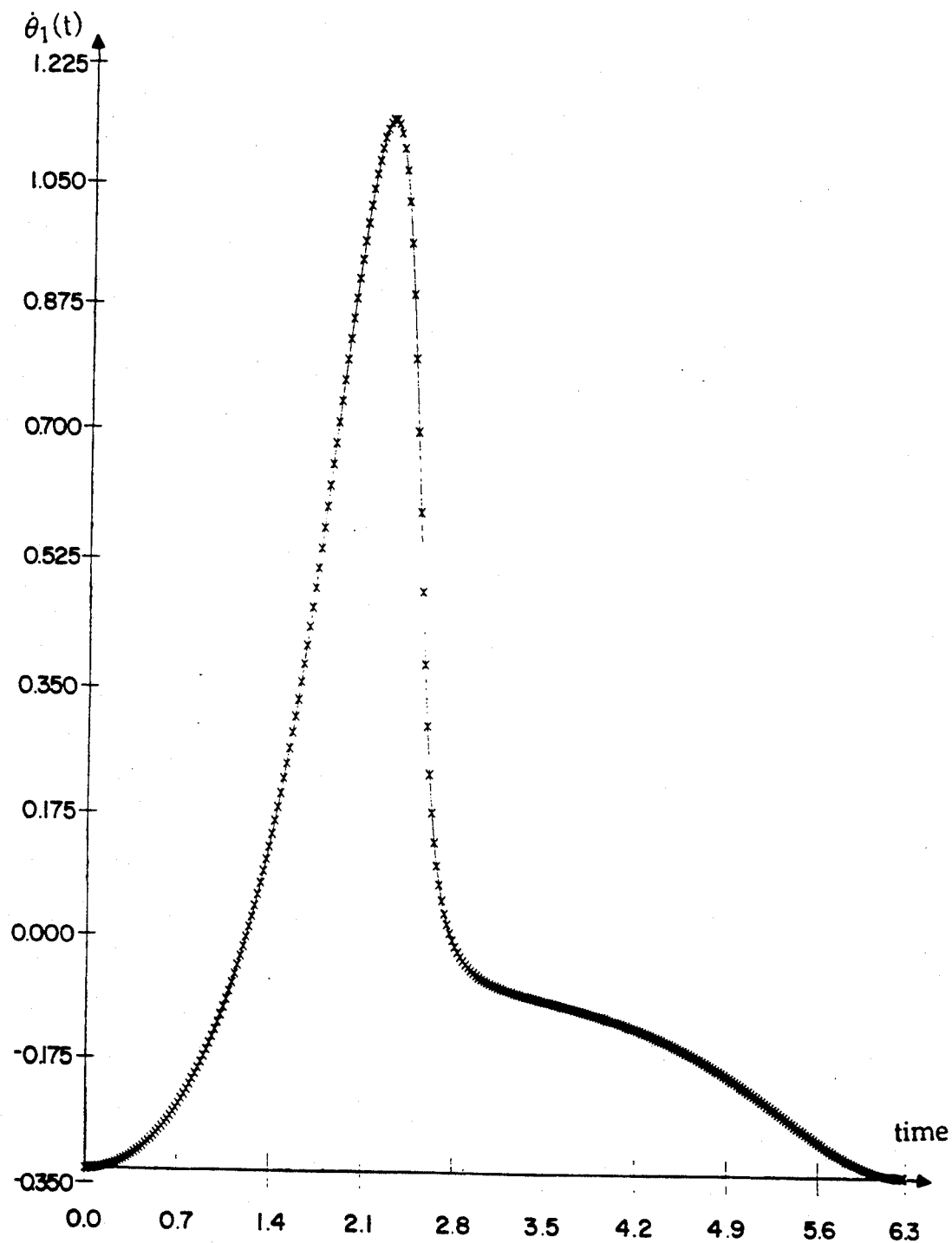
Figure 15:
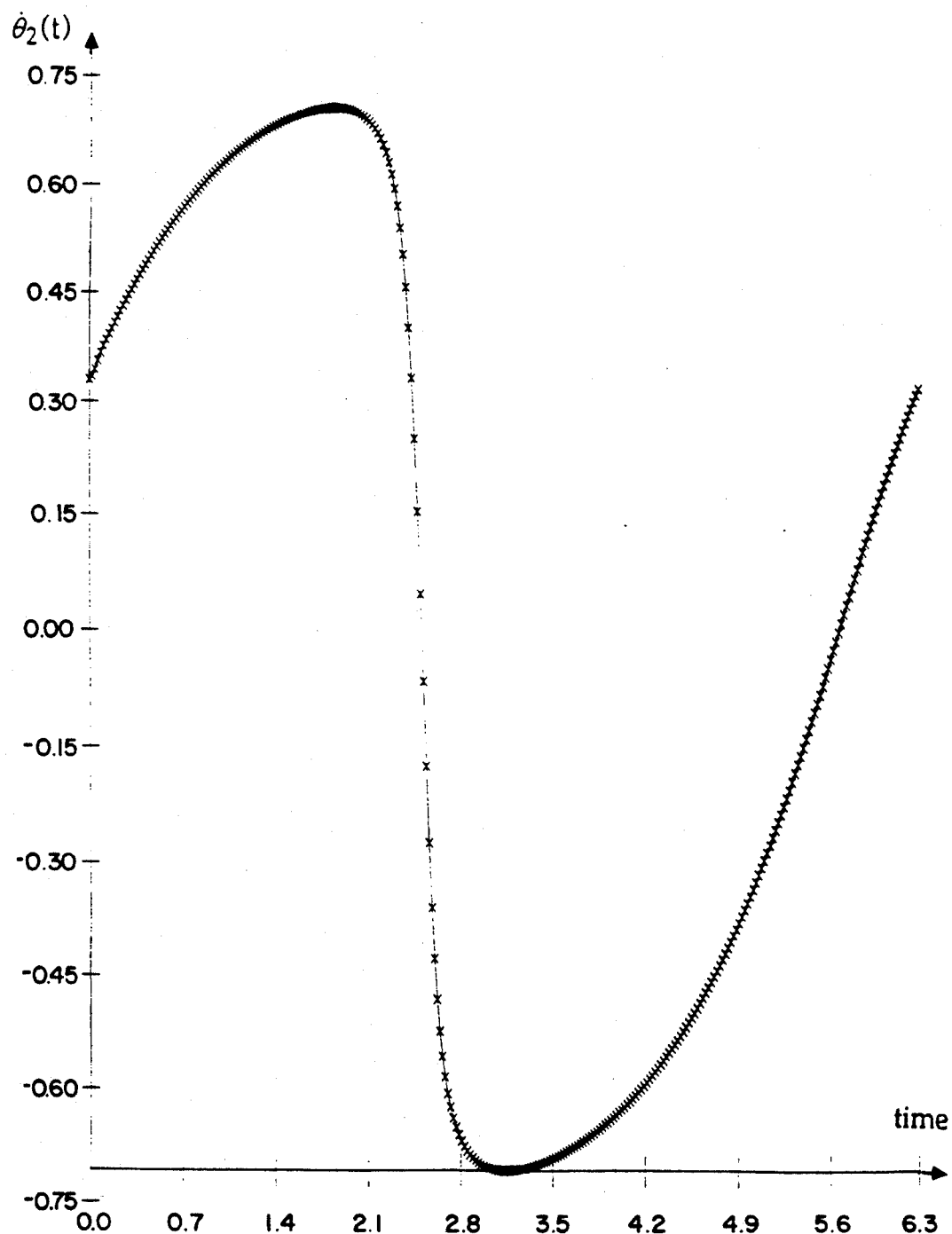
Figure 16:
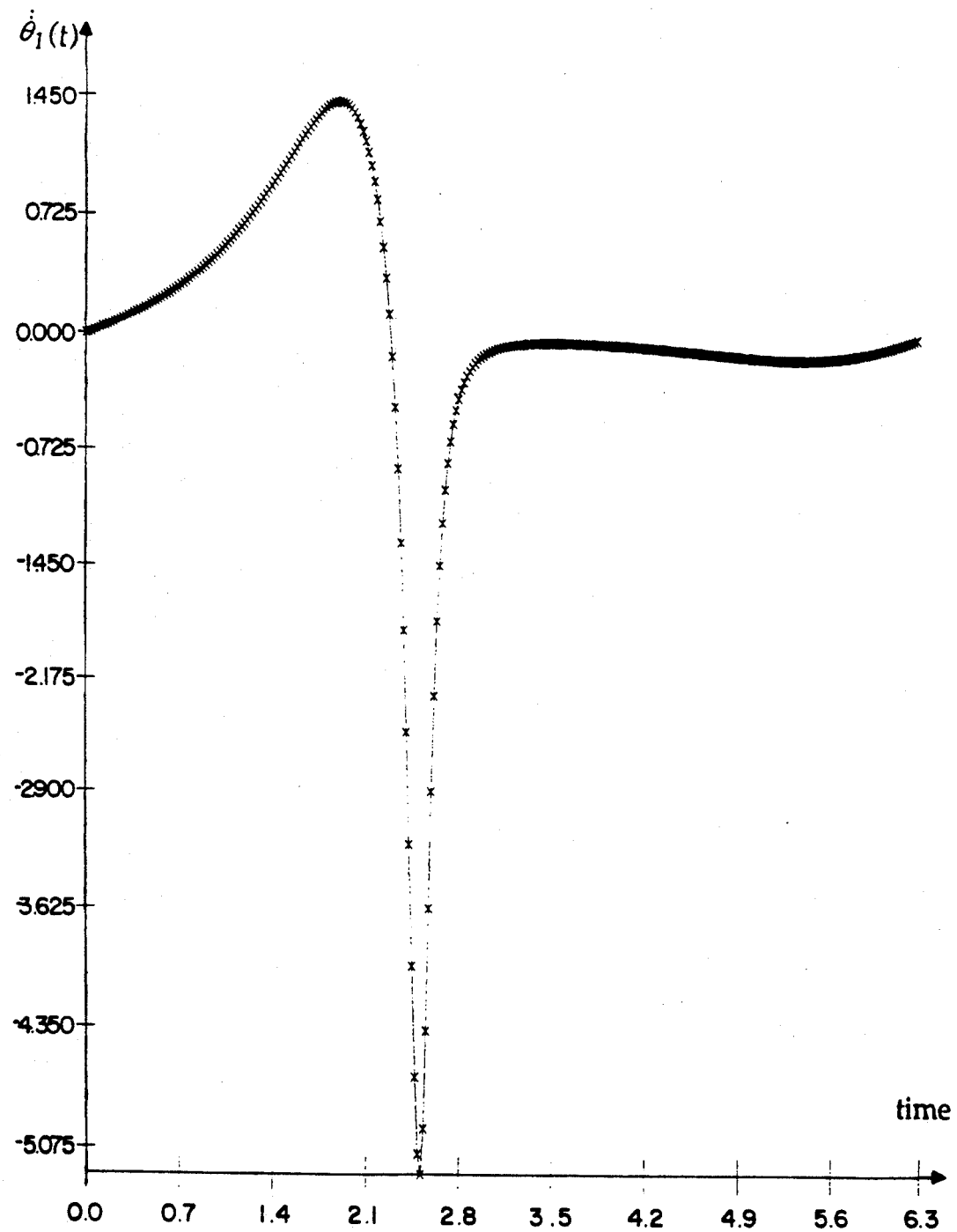
Figure 17:
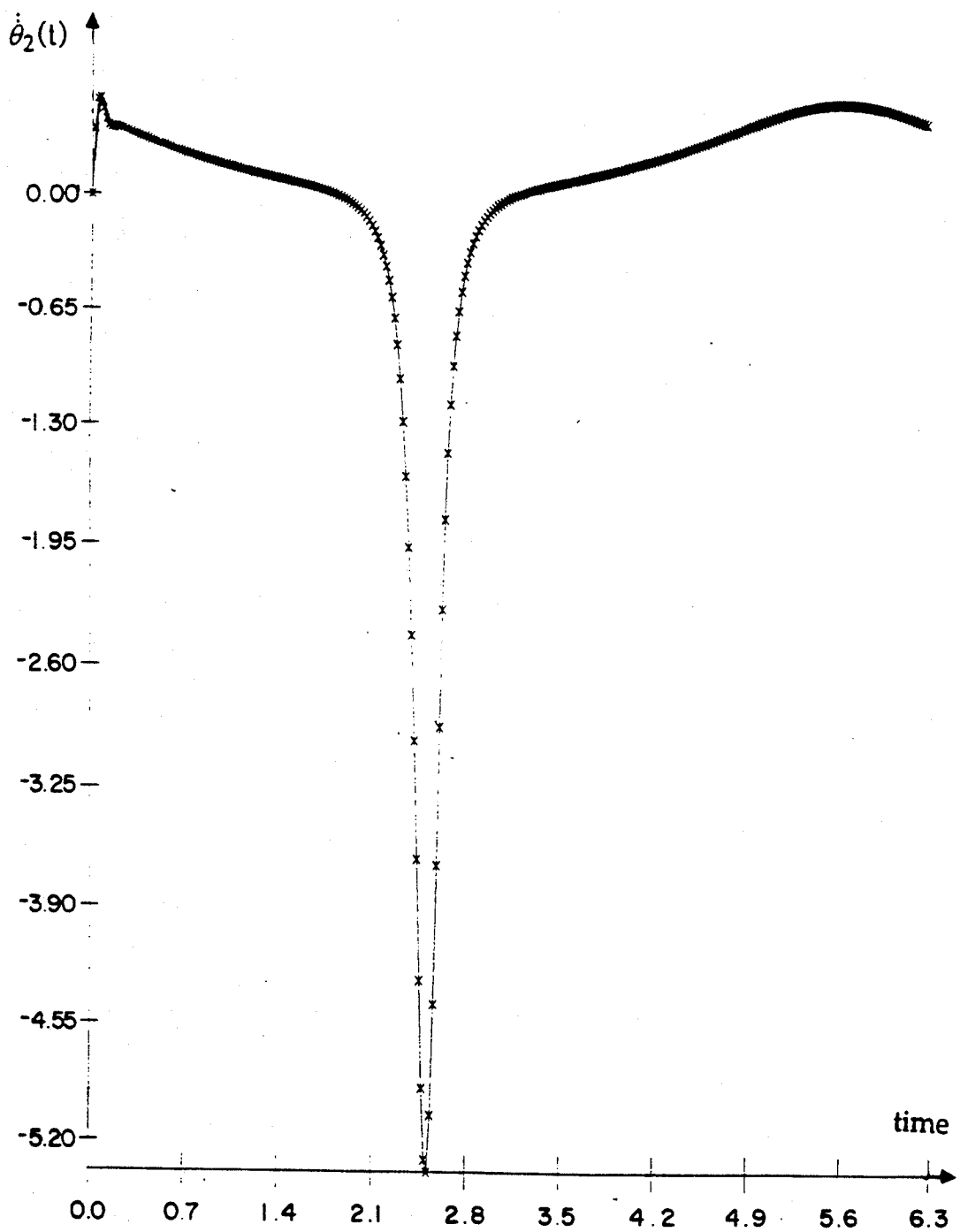
Figure 18:
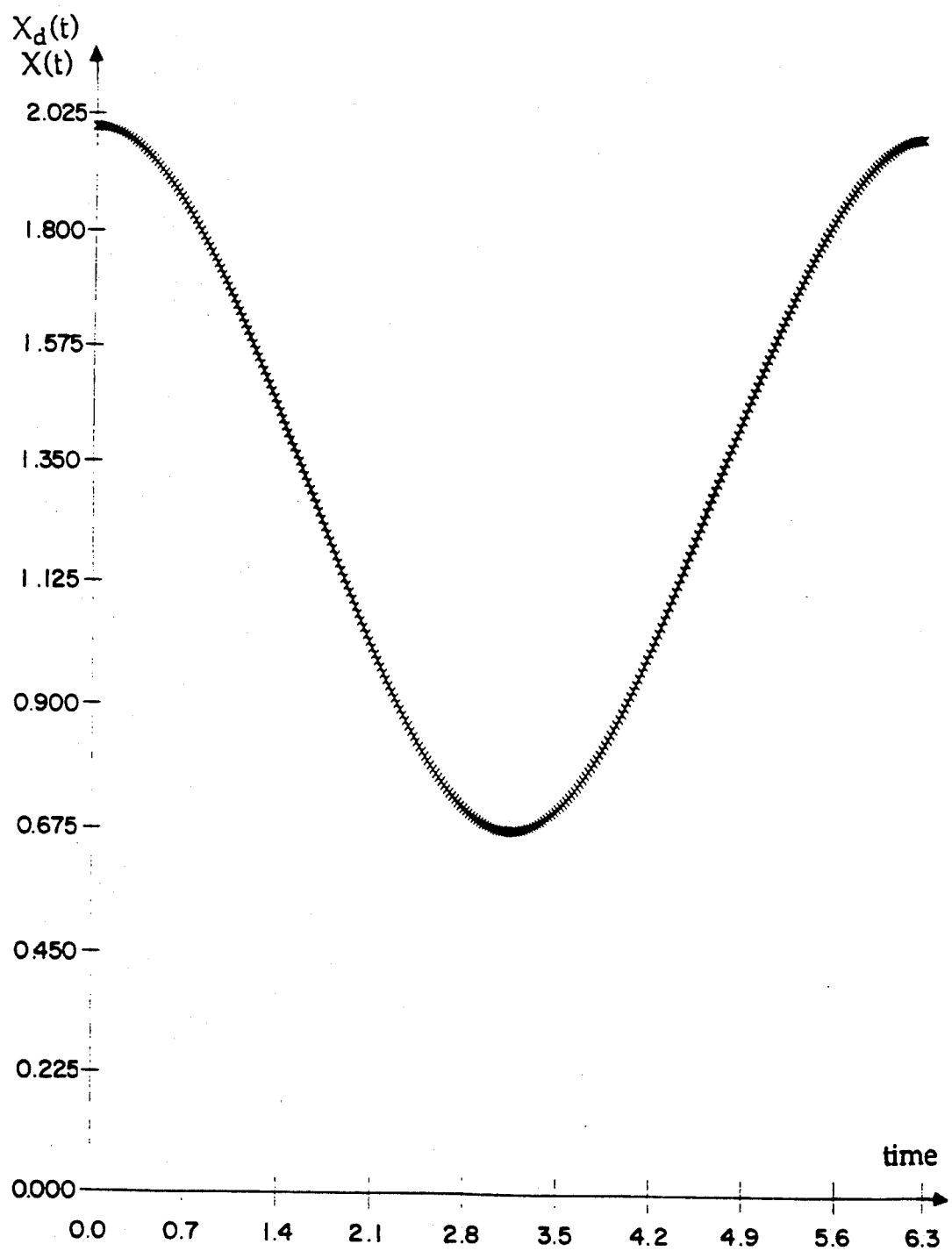
Figure 19:
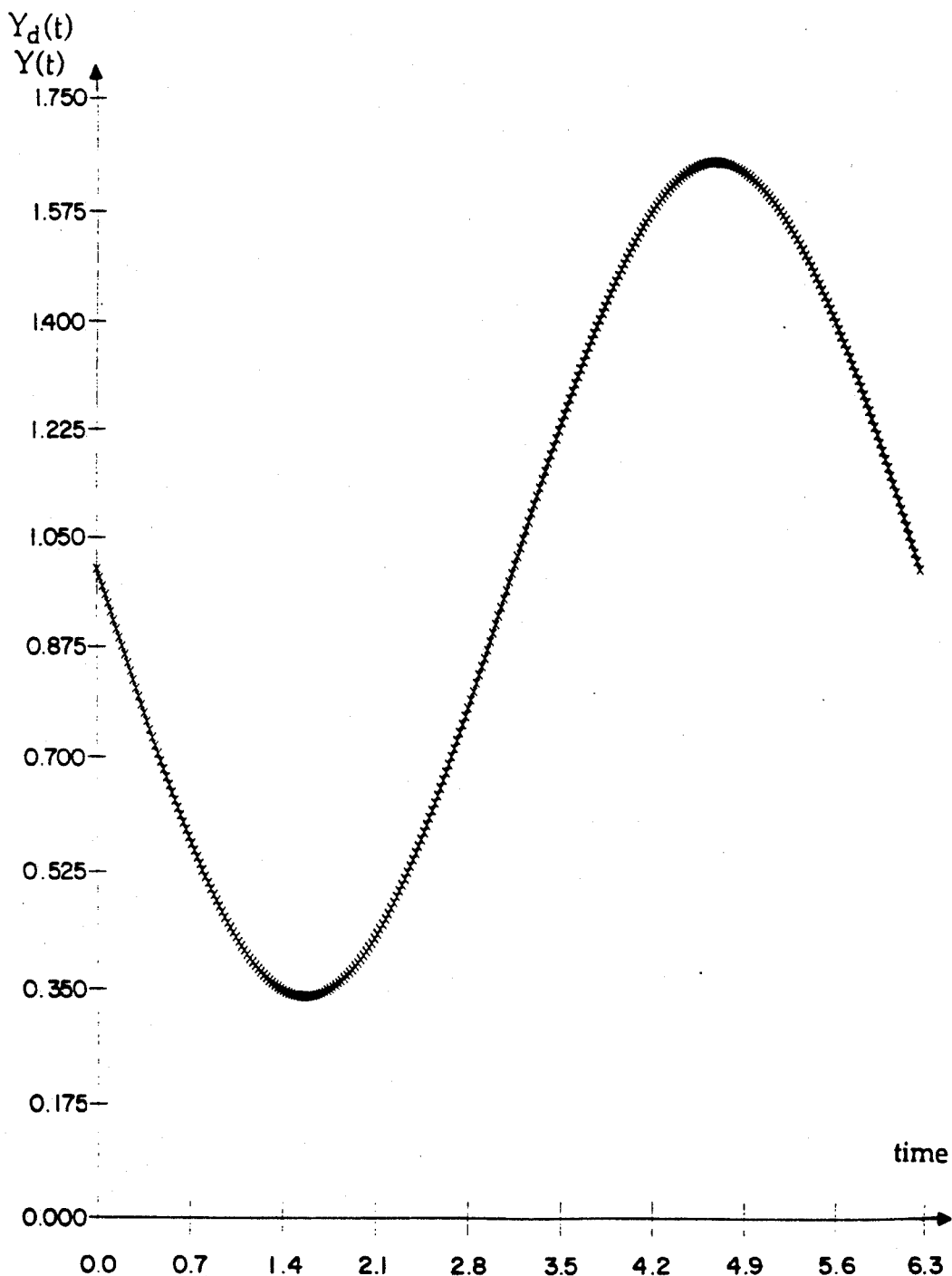
Figure 20:
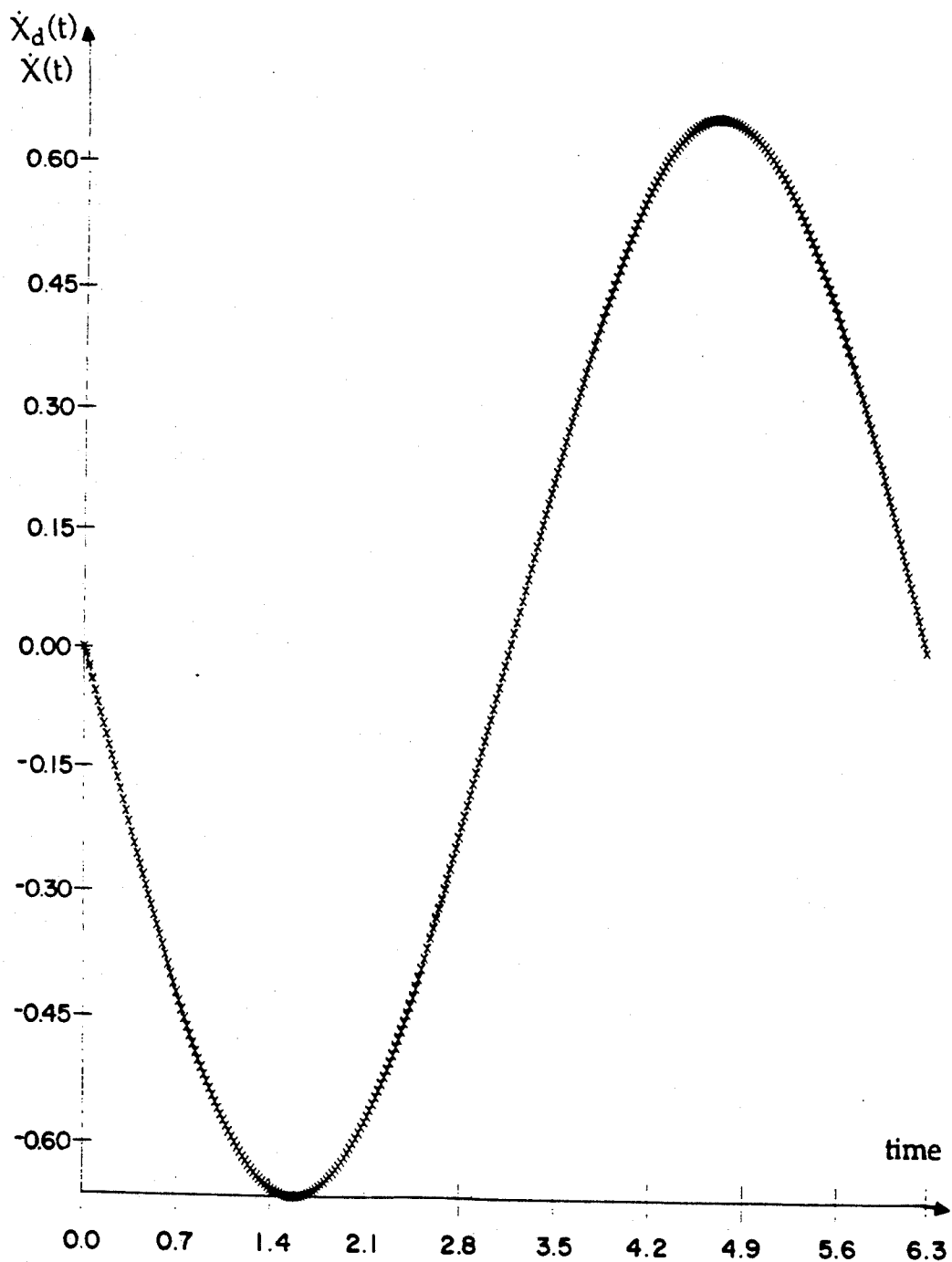
Figure 21:
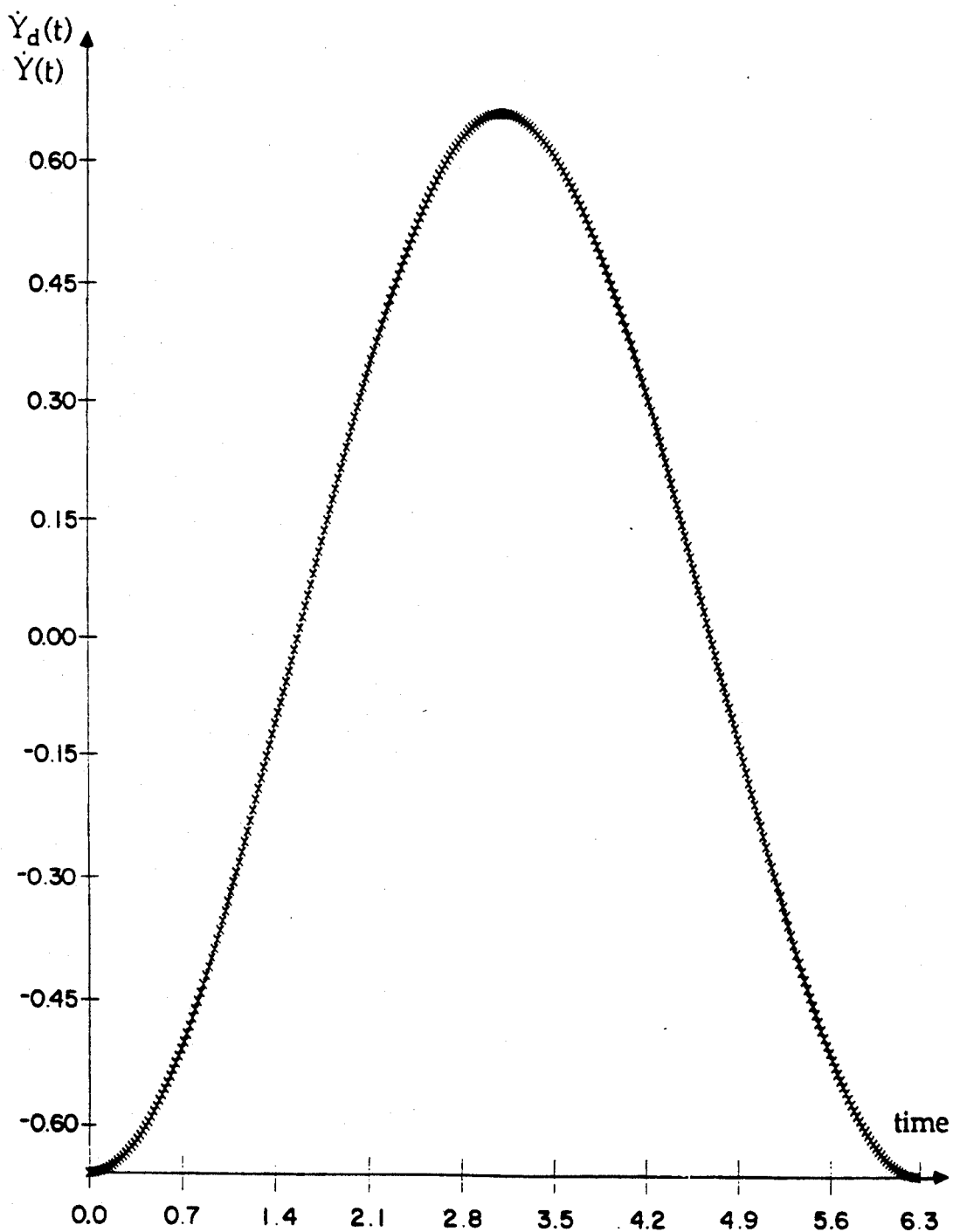
Figure 22:
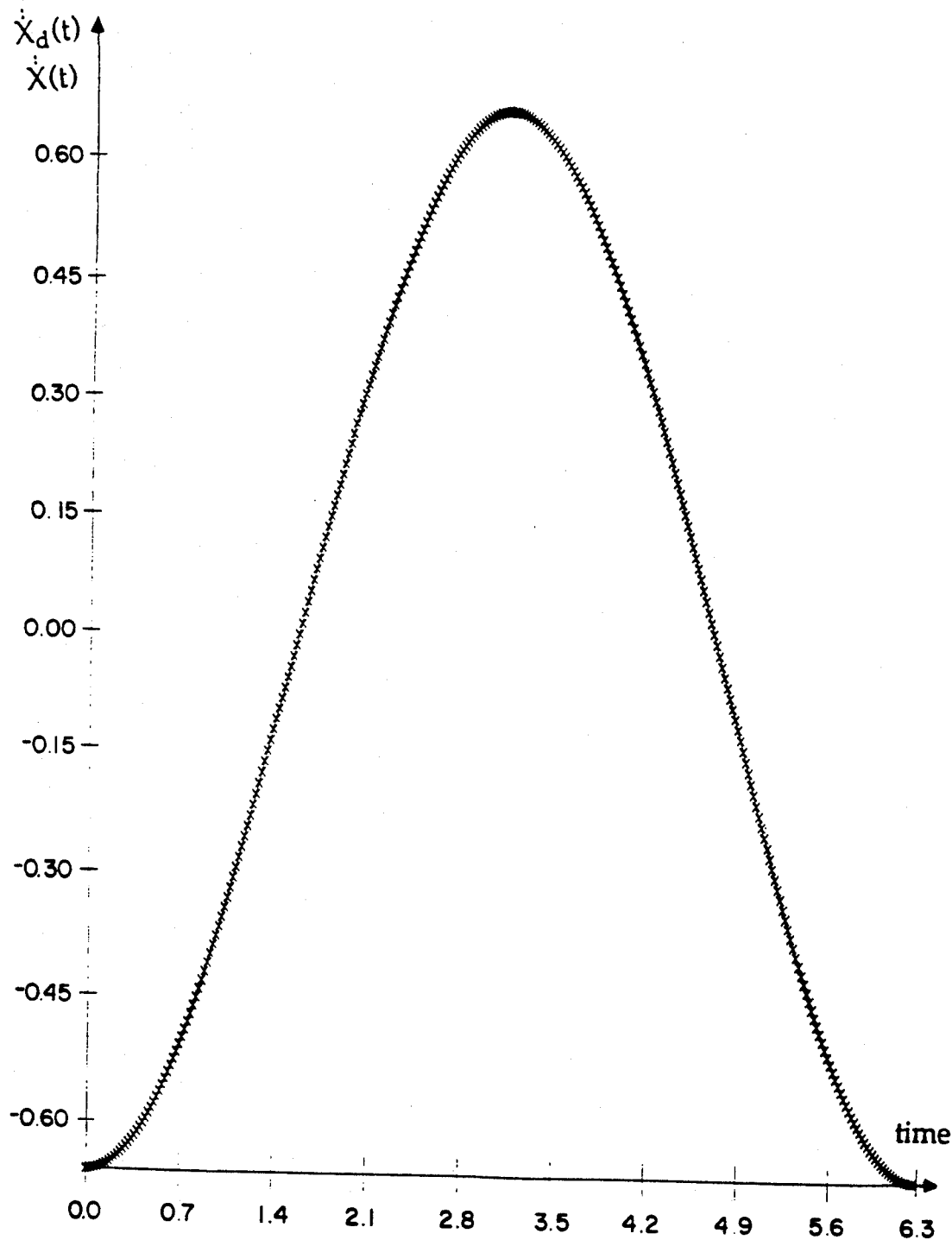
Figure 23:
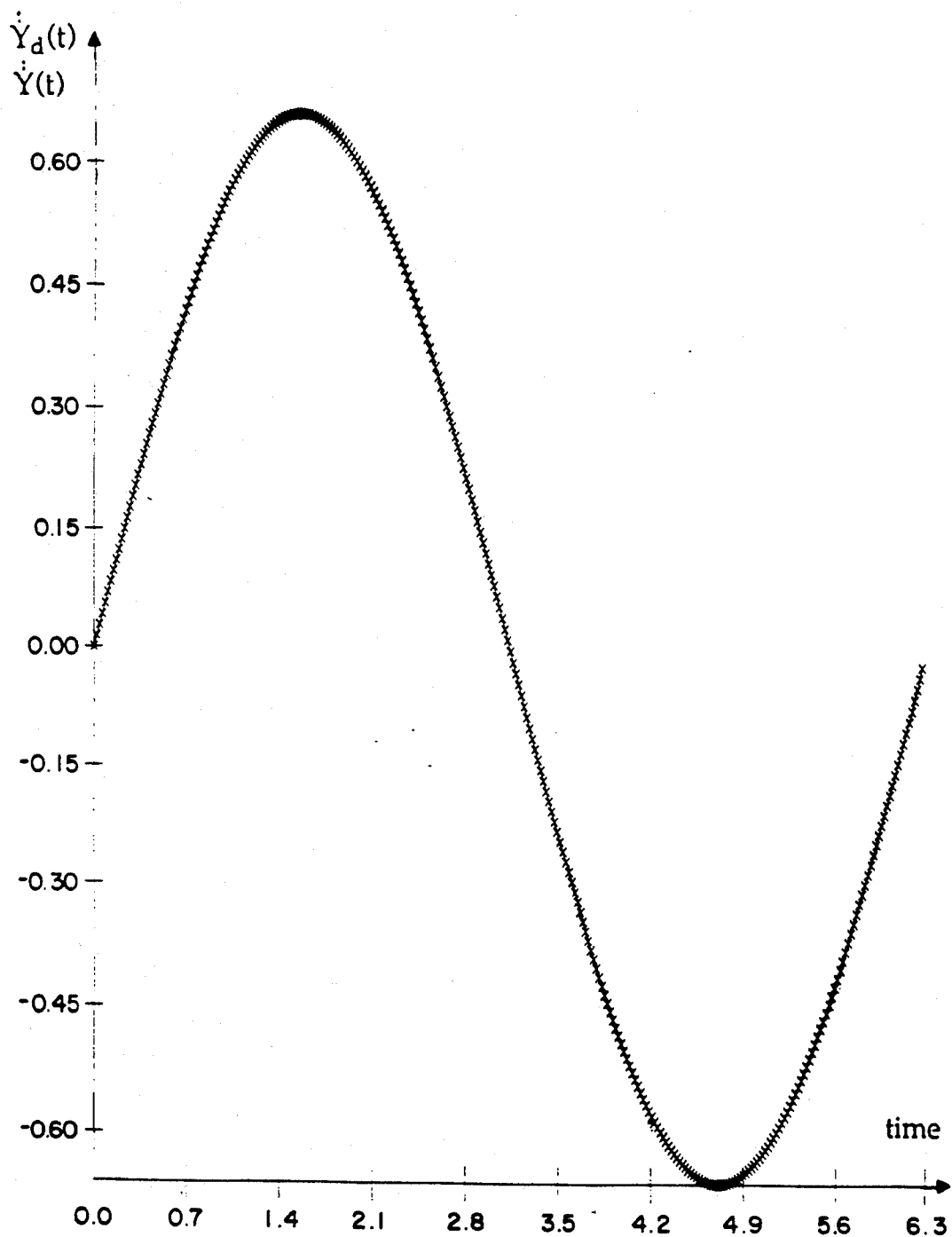

To simulate the behavior and robustness to singularities of the above robot control system based on the computer method outlined in the flow chart of FIG.-5 and the MMD algorithm outlined in the flow charts of FIG.-2 and FIG.-3, computer simulations of the two-link planar robot and the four-link redundant planar robot of FIG.-4 are presented and shown in FIG.-7 through FIG.-10. For both robots, singularities occur when the links are collinear. For the two-link robot two different cases were considered for simulation. In the first case, FIG.-7, the robot end effector follows, with a uniform Cartesian speed of 0.66 m/s (in magnitude), a circle trajectory, 26, which crosses a near singularity at 27. The simulation results, shown in FIG.-7, were performed with the links lengths values $l_1=2$ and $l_2=1$. The cirles 28 and 29 are the boundaries of the two-link robot workspace. The robot end effector initial and final positions are 30. The Figures referred to as FIGS. 11-23 are detailed simulation results for the above-described two-link robot example. FIG. 11 repeats the illustration of FIG.-7. FIG. 12 and FIG. 13 represent the joint position time history during the robot enf effector travel of FIG. 11. FIG. 14 and FIG. 15 represent the joint velocity time history during the robot end effector travel of Annex 1. FIG. 16 and FIG. 17 represent the joint acceleration time history during the robot end effector travel of FIG. 11.

FIGS. 18 through 23 represent the actual and desired Cartesian trajectory (position, velocity, acceleration) of the robot end effector. As can be seen, the present invention yields actual results which coincide with the desired Cartesian trajectory at all points, including at near singularities.

Figure 8A:
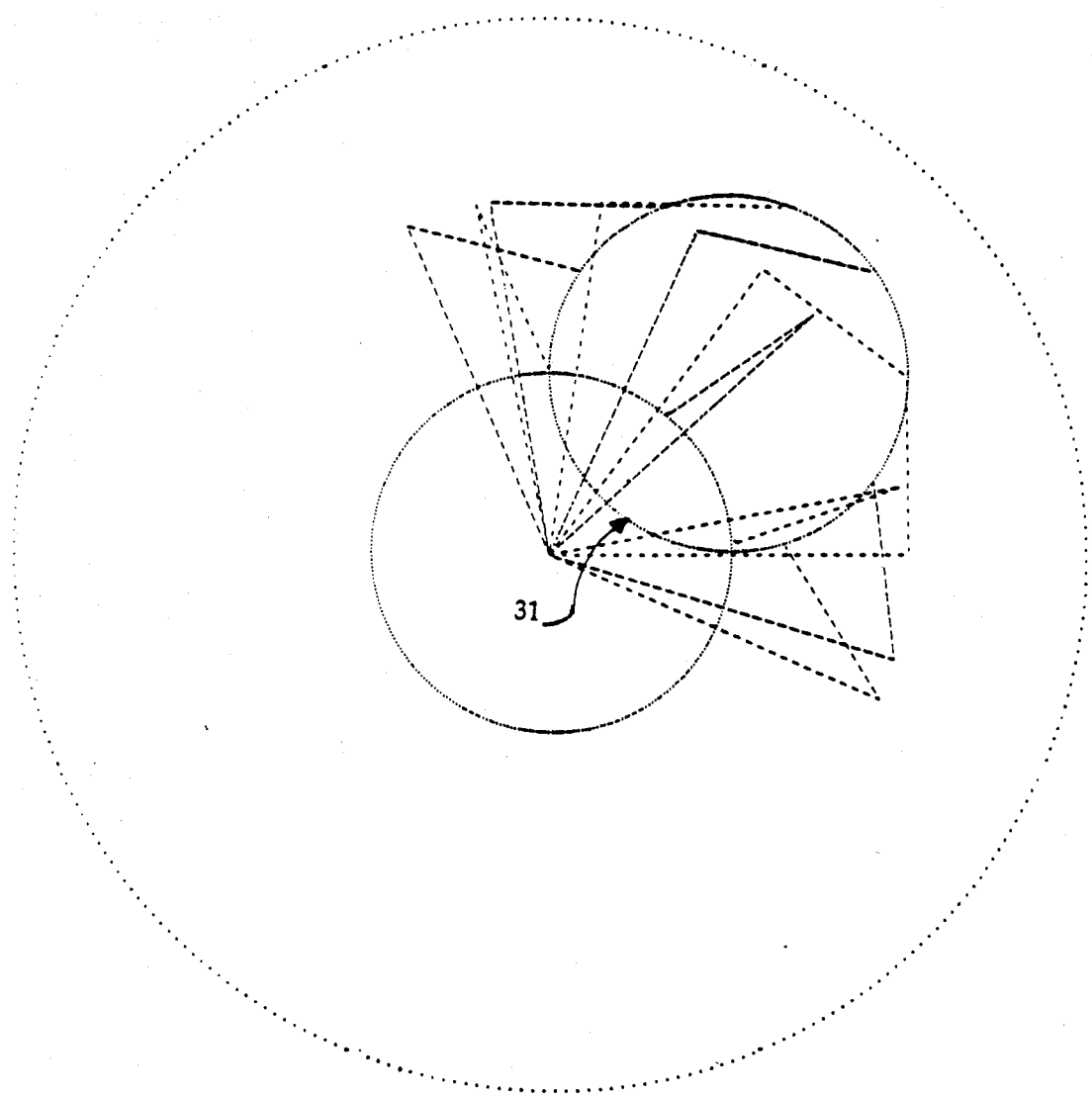
Figure 8B:
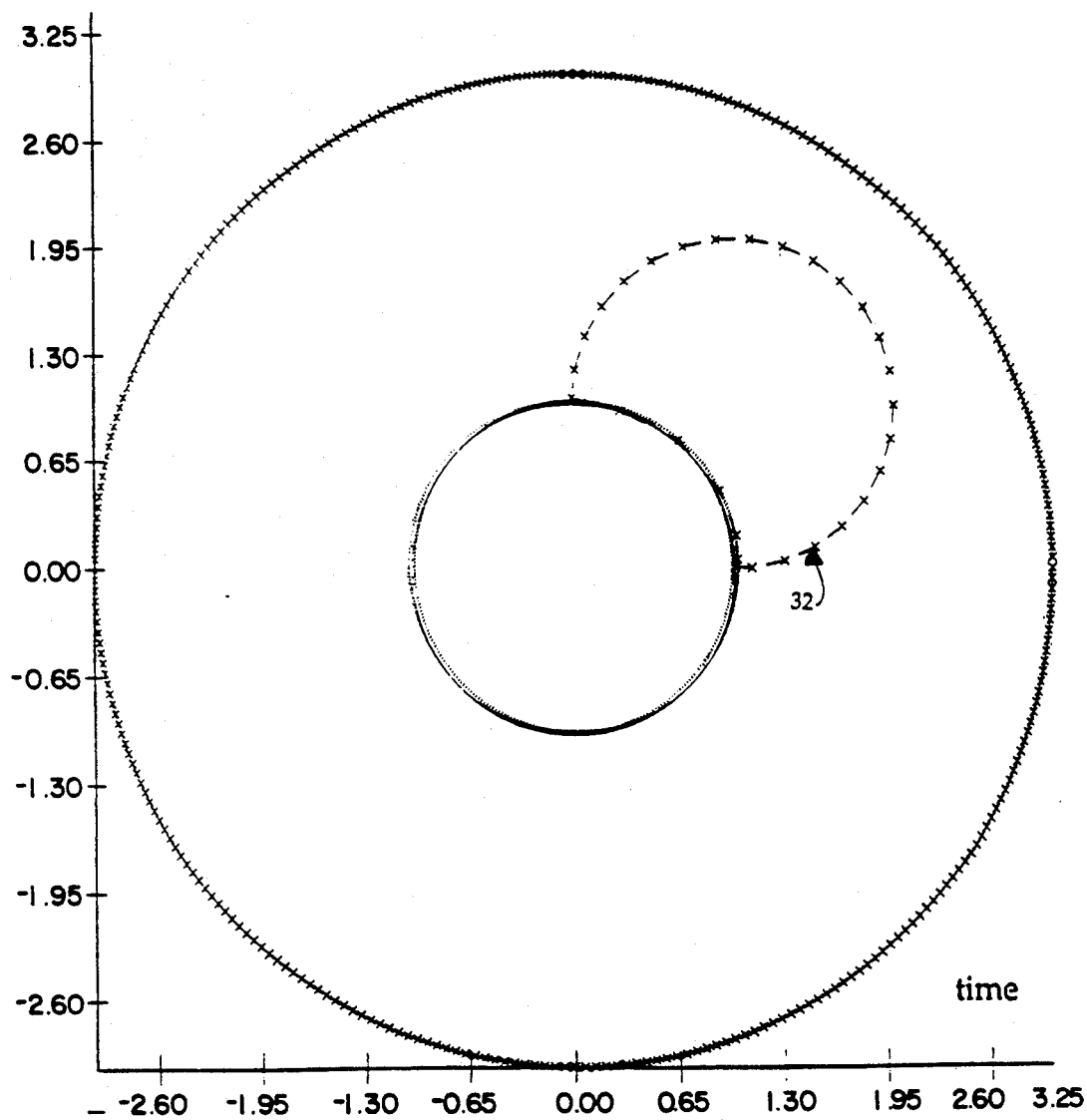
Figure 9:
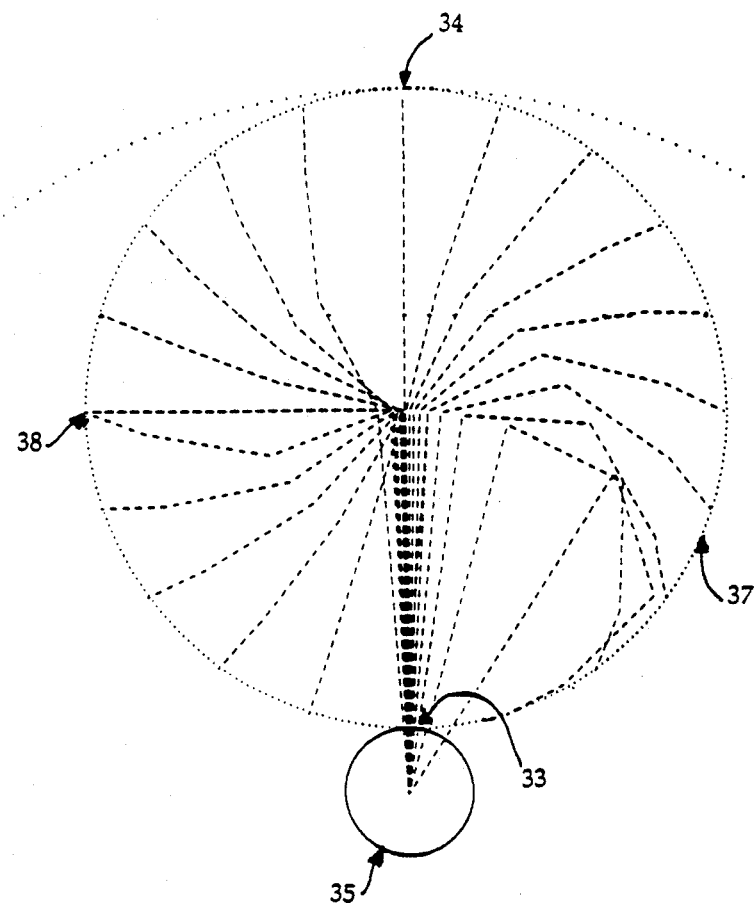

In the second case, the robot end effector tries to follow, with a uniform Cartesian speed of 1 m/s (in magnitude), a desired circle trajectory, which goes partially out of the range the robot workspace, 31 in FIG.-8a. The simulation results are shown in FIG.-8a. For clarity, in FIG.-8b are shown the simulation results of only the actual trajectory followed by the end effector 32.

For the four-link robot two different cases were considered for simulation. In the first case, FIG.-9, the robot end effector follows, with a uniform Cartesian speed of 2.5 m/s (in magnitude), a circle trejectory, 37, which crosses two different singularities at 33 and 34; these two singularities correspond respectively to the robot links being completely extended, and the robot links being completely retracted. The simulation results, shown in FIG.-9, were performed with the links lengths values $l_1=3$, $l_2=1$, $l_3=1$, $l_4=0.5$. The circles 35 and 36 are the boundaries of the four-link robot workspace. The robot end effector initial and final positions are 38.

Figure 10:
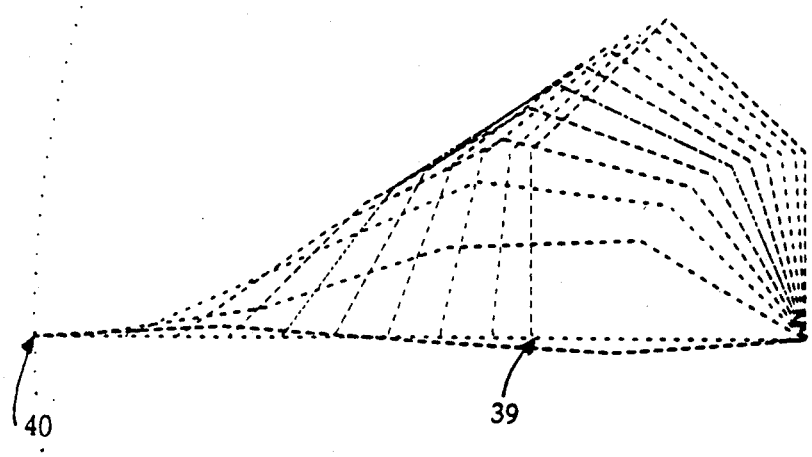

In the second case, FIG.-10, the robot end effector tries to follow, a LSPB (Linear Segment with Parabolic Blends) straight line trajectory from initial point 39, to singularity point 40. The simulation results shown in FIG.-10, were performed with the links lengths values $l_1=1$, $l_2=1$, $l_3=1$, $l_4=1$.

OTHER EMBODIMENTS

Other Embodiments Within the Robotics Field

As discussed above in the section general, the resulting symbolic MMD of the robot jacobian shows clearly and leads to some analytical results that may be used in the evaluation and better understanding of the robot performance, as well as in the future design of robot prototypes. These analytical results are hard to find and not offered by any other numerical method. For example:

PLANNING TRAJECTORIES

The analytical formulations of the MMD diagonal values of the robot jacobian can be analyzed and used to have an idea about some global and local properties of the robot workspace. More specifically, the analysis of the MMD diagonal values analytical formulations will lead to a desirable property that has not been yet made possible or offered by any other numerical method. Namely, the desirable property of being able to determine some bound on the maximum magnitude of the joint speed in terms of the bound on the magnitude of the robot end effector Cartesian speed, and in terms of the joint configuration of the robot. It is well known that the maximum ratio between the magnitude of the joint speed and the magnitude of the Cartesian speed is given by, $$\max \frac{||\dot{\theta}||_2}{||\dot{x}_d||_2} = \frac{1}{\sigma_m}$$

where $\sigma_m$ is the minimum singular value of the robot jacobian. Unfortunately, in general, the minimum singular value of an mxn robot jacobian, can be obtained only numerically thought iterative and computationally very costly numerical schemes. In accordance with the present invention, and more specifically based on the second property given in the section entitled Mathematical Derivation, the maximum ratio between the magnitudes of the joint velocity and Cartesian velocity is always greater or equal to the reciprocal of the minimum MMD diagonal value of the robot jacobian, i.e., $$\max \frac{||\dot{\theta}||_2}{||\dot{x}_d||_2} = \frac{1}{\sigma_m} \geq \frac{1}{w_m}$$

For example in the case of the two-link robot the above inequality becomes, $$\max \frac{||\dot{\theta}||_2}{||\dot{x}_d||_2} \geq \frac{1}{|l_1 s_2|}$$

Therefore, for the two-link robot, the term $$\frac{1}{|l_1 s_2|}$$

may be considered as a lower bound on the maximum ratio between the magnitudes of the joint speed and Cartesian speed in terms of the joint configuration of the robot. We may notice that both the diagonal values $w_1$, $w_2$ are independent of $\theta_1$ but dependent only on $\theta_2$. This is true not only for the two-link robot but for any robot manipulator: the diagonal values obtained by the symbolic MMD of any 6×n robot jacobian (n being the number of robot links) are independent of the first joint. From the foregoing, we may see that the Cartesian speed magnitude, noted v, that may be specified during trajectory planning at all the points in the two-link robot workspace characterized by $\theta_2 = \theta_2^*$ must verify the following inequality, $$v \leq |l_1 s_{\theta_2^*}| \, ||\dot{\theta}_{max}||_2 \quad (1)$$

where $||\dot{\theta}_{max}||_2$ is the maximum joint velocity physically reachable by the robot. We may note that the points in the workspace characterized by $(\theta_2 = \theta_2^*)$ form a circle in the robot workspace that we denote by C. From the foregoing, since the MMD diagonal values $w_1$, and $w_2$ are independent of the joint variable $\theta_1$ we can state that all the points on the circle C in the robot workspace, share the same property that the magnitude Cartesian speed v, to be specified during trajectory planning at these points for any Cartesian trajectory crossing the circle C, must verify the inequality (1). Hence, for the points on the circle C in the robot workspace characterized by $(\theta_2 = \theta_2^*)$ the expression $v \leq |l_1 s_{\theta_2^*}| \, ||\dot{\theta}_{max}||_2$ may be used as a measure to provide information concerning the determination of the Cartesian speed, v, not to exceed for all the trajectories crossing the circle C at their intersections with the circle C, in order not to exceed the maximum magnitude of the joint velocity physically reachable by the robot.

Reciprocally, if the magnitude of the joint velocity is kept constant and equal to $\alpha$, based on the property 2 given in the section mathematical derivation, the maximum ratio between the magnitudes of the Cartesian velocity and joint velocity $\alpha$, verifies the following inequality, $$w_1 \leq \max \frac{||\dot{x}||_2}{\alpha} = \sigma_1 \leq \left[ \sum_{i=1}^{m} w_i^2 \right]^{\frac{1}{2}}$$

where, $\sigma_1$ and $w_1$ are respectively the maximal singular value and maximal MMD diagonal value of the robot jacobian. For the two-link robot the above inequality becomes, $$\sqrt{l_2^2 + (l_1 c_2 + l_2)^2} \leq \max \frac{||\dot{x}||_2}{\alpha} \leq \sqrt{2 l_2^2 + l_1^2 + 2 l_1 l_2 c_2}$$

From the foregoing we see that the absolute maximum Cartesian speed reachable by the two-link robot end effector is $\sqrt{l_2^2 + (l_1 + l_2)^2} \, \alpha$, that is when the end effector is on the workspace boundary and the robot links are completely extended; and the maximum magnitude of the Cartesian speed that the end effector may reach at the origin ($\theta_2 = \pi$), is $\sqrt{l_2^2 + (l_1 + l_2)^2} \, \alpha$, that is when the robot links are completely retracted. For example, when $$\left( \theta_2 = \frac{\pi}{2} \right),$$

the maximum Cartesian speed in magnitude that the robot end effector may reach is a value between $\sqrt{2} l_2 \, \alpha$ and $\sqrt{2 l_2^2 + l_1^2} \, \alpha$, i.e., for $l_1 = l_2 = 1$ m, and for the magnitude of the joint velocity $\alpha$ kept constant and equal to 1 rd/s, the maximum Cartesian speed (in magnitude) that the robot end effector may reach at the configurations $$\theta_2 = \frac{\pi}{2}$$

is a value between $\sqrt{2}$ m/s and $\sqrt{3}$ m/s.

The above reasoning may be repeated now for the following fundamental question: given a robot configuration ($\theta_1^*$, $\theta_2^*$) in the robot workspace and given the maximum possible actuator torque limits max $||\tau||_2 = \tau_{max}$, the fundamental question is what is the maximum magnitude of Cartesian acceleration $||\ddot{x}_d||_2$ that one can specify at the configuration $(\theta_1^*, \theta_2^*)$ in order not to exceed the actuators limit bound $\tau_{max}$? It is well known that the robot equations of free motion for an n-link robot manipulator are, $$\tau = D(\theta)J^+(\theta)(\ddot{x} - \dot{J}(\dot{\theta},\theta)\dot{\theta}) + h(\dot{\theta},\theta) + g(\theta)$$

Where, $\tau = n \times 1$ vector of input generalized torques and forces.

$D(\theta) = n \times n$ positive definite inertia matrix.

$J^+(\theta) = n \times 6$ robot jacobian pseudo-inverse matrix.

$h(\dot{\theta}, \theta) = n \times 1$ vector defining coriolis and centrifugal terms.

$g(\theta) = n \times 1$ vector defining the gravity terms.

$\ddot{x} = 6 \times 1$ vector defining the Cartesian linear and angular acceleration of the robot end effector.

$\dot{J}(\dot{\theta}, \theta) = 6 \times n$ matrix defining the jacobian derivative with respect to time.

$\theta = n \times 1$ vector defining the robot joint coordinates.

$\dot{\theta} = n \times 1$ vector defining the robot joint coordinates velocities.

The same reasoning as before may be done by considering this time the minimum diagonal value $w_2^*$ given by the MMD of the matrix $M(\theta)$, defined as the product of the jacobian matrix $J(\theta)$, by the inverse of the robot inertia matrix $D^{-1}(\theta)$, i.e., $M(\theta) = J(\theta)D^{-1}(\theta)$. The inertia matrix $D(\theta)$ in the case of the two link robot is a $2 \times 2$ matrix depending only on $\theta_2$, the link lengths $l_1$ and $l_2$, the weights $m_1$ and $m_2$ of the links, and the individual moments of inertias $I_1$, $I_2$, through the link 1 and 2 centers of mass. If the term $\dot{J}(\dot{\theta}, \theta)\dot{\theta}$ is neglected, we have, $$\max \frac{||\tau - h(\dot{\theta},\theta) - g(\theta)||_2}{||\ddot{x}_d||_2} \geq \frac{1}{w_2^*(\theta_2)}$$

Therefore, in order not to exceed the torques limits $\tau_{max}$, the Cartesian, acceleration $||\ddot{x}_d||_2$, to be specified at all the points on the circle C in the robot workspace must verify, $$||\ddot{x}_d||_2 \leq \max ||\tau_{max} - h(\dot{\theta}^*,\theta^*) - g(\theta^*)||_2 w_2^*(\theta_2^*)$$

where $\dot{\theta}^*$ is the joint velocity with which the specified trajectory crosses the circle C at the configuration $\theta^*$. Recall the circle C is the set of points in the robot workspace characterized by $\theta_2 = \theta_2^*$.

MODIFYING ON LINE UNREALIZABLE TRAJECTORIES

If a trajectory is not realizable how can it be modified on line in order not to exceed the joint velocities. In further accord with the present invention a variation of the procedure Damped jacobian pseudo-inverse (Damped Least Square method) whose principles and shortcoming are described in the article by Stephen K. Chan and Peter D. Lawrence, "General inverse kinematics with the error damped pseudo-inverse", Proceedings of the 1988 IEEE International Conference on Robotics and Automation, and its references, can be used to reduce and damp on-line the joint velocities near singularities. A number of algorithms based on the damped pseudo-inverse are described and compared in that article. The shortcomings of the Damped pseudo-inverse methods are:

lack of efficiency in the computations;

most importantly, the rate of convergence of the controller based on damped pseudo-inverse methods, decreases especially near robot singularities.

Using the principles of this invention it is possible to efficiently (computational point of view) damp and reduce on line the joint velocities in order not to exceed the physical joint velocities limits, without decreasing the rate of convergence of the robot controller near singularities. This can be done, in the case of the two-link robot for example, by multiplying the diagonal values $w_1$ and $w_2$ by the same time varying, appropriately chosen function $f(w_1, w_2)$. The fact of multiplying the diagonal values $w_1$, and $w_2$ by the same time varying function $f(w_1, w_2)$ will affect the magnitude of the joint velocities $||\dot{\theta}||_2$ (and therefore the magnitude of the Cartesian velocity $||\dot{x}||_2$) without affecting the directions of the joint velocities. For an appropriate choice of the time varying function $f(w_1, w_2)$, this method will lead the robot to reduce the Cartesian speed (in magnitude) near singularities while still keeping track of the desired trajectory.

NOTE

As seen above, the question of modifying the trajectory on-line in order not to exceed the actuator torques may be covered using the same above reasoning, but by using instead the MMD diagonal values $w_1^*$, $w_2^*$ of the matrix $M(\theta) = J(\theta)D^{-1}(\theta)$ (as defined above).

ROBOT MECHANICAL DESIGN

As future robots are called to achieve more versatile tasks in a changing environment (in a space station for example) a need for designing and building robots with variable and adjustable kinematic parameters (link lengths and geometry) and adjustable dynamic parameters (weight of links, moment of inertia, maximum actuator torques) is needed. In further accord with the present invention the resulting symbolic MMD of the robot canonical jacobian, which will be defined herein below, is of special importance in the future design of robot prototypes. More specially the analysis of the MMD diagonal values of the robot canonical jacobian, is useful for the dynamic and kinematic designs of robots.

ROBOT KINEMATIC DESIGN

Definition

If $X = f(\theta)$ represent a robot forward kinematic equations, the canonical jacobian noted, $\bar{J}(\theta)$ is defined by the inventor as, $$\bar{J}(\theta) = \frac{\partial f(\theta)}{\partial \gamma}$$

where $\gamma$ is a vector of variables which occur in the robot forward kinematic equations and which are linear combinations of the joint variables.

For example, for the two-link robot the canonical jacobian matrix $\bar{J}(\theta)$ is defined as follows: as seen above in the section entitled MMD and robotics, the forward kinematic equations are rewritten here for clarity, $$X = \begin{bmatrix} x \\ y \end{bmatrix} = \begin{bmatrix} l_1 c_1 + l_2 c_{12} \\ l_1 s_1 + l_2 s_{12} \end{bmatrix}$$

The forward kinematic equations are functions of the variables $\gamma_1 = \theta_1$, $\gamma_2 = \theta_1 + \theta_2$. If the new joint variables vector, $\gamma$ is defined as $$\gamma = \begin{bmatrix} \gamma_1 \\ \gamma_2 \end{bmatrix}$$

then $\bar{J}(\theta)$, according to the above definition, is $$\bar{J}(\theta) = \frac{\partial X}{\partial \gamma} = \begin{bmatrix} \frac{\partial x}{\partial \gamma_1} & \frac{\partial x}{\partial \gamma_2} \\ \frac{\partial y}{\partial \gamma_1} & \frac{\partial y}{\partial \gamma_2} \end{bmatrix}$$

$$= \begin{bmatrix} -l_1 s_1 & -l_2 s_{12} \\ l_1 c_1 & l_2 c_{12} \end{bmatrix}$$

The robot jacobian $J(\theta)$ expressed in terms of the robot canonical jacobian $\bar{J}(\theta)$ is, $$J(\theta) = \bar{J}(\theta) N$$

where the matrix N is defined as, $$N = \begin{bmatrix} 1 & 0 \\ 1 & 1 \end{bmatrix}$$

The MMD decomposition of the robot canonical jacobian in the case of the two-link robot is, $$\bar{J}(\theta) = \begin{bmatrix} -s_{12} & -c_{12} \\ c_{12} & -s_{12} \end{bmatrix} \begin{bmatrix} \sqrt{l_2^2 c_2^2 + l_2^2} & 0 \\ 0 & |l_1 s_2| \end{bmatrix} \begin{bmatrix} \frac{l_1 c_2}{\sqrt{l_1^2 c_2^2 + l_2^2}} & \frac{l_2}{\sqrt{l_1^2 c_2^2 + l_2^2}} \\ \delta & 0 \end{bmatrix}$$

where, $$\delta = \begin{cases} -1 \text{ if } s_2 \geq 0 \\ 1 \text{ if } s_2 < 0 \end{cases}$$

where $w_1 = \sqrt{l_1^2 c_2^2 + l_2^2}$, and $w_2 = |l_1 s_2|$, are the MMD diagonal values of the two-link robot canonical jacobian $\bar{J}(\theta)$, and the measure $k(\theta)$ of the "nearness of the canonical jacobian matrix to rank deficiency"—as defined above in the section entitled Computation and Implementation on a Digital Computer—, is $$k(\theta) = \frac{|l_1 s_2|}{\sqrt{l_1^2 c_2^2 + l_2^2}}$$

The analytical formulations of the MMD diagonal values of the robot canonical jacobian shows clearly the infuence of the robot link lengths on the measure $k(\theta)$. In order to increase the performance of a controlled robot, the measure $k(\theta)$ of the "nearness of the of the canonical jacobian to rank deficiency" must be increased to 1 as much as possible, to keep good manipulability of the robot. Hence the kinematic design (for example choosing the appropriate link lengths $l_1$ and $l_2$) in the case of the two link robot is resolved to maximize the function $$k(\theta_2^*) = \frac{w_2(\theta_2^*)}{w_1(\theta_2^*)} = \frac{|l_2 s_2^*|}{\sqrt{l_2^2 + l_1^2 c_2^{2*}}},$$

for a certain nominal joint value $\theta_2^*$ which characterizes the task in hand. For example, if we want to determine the lengths $l_1$ and $l_2$ of the two-link robot in order to increase the performance of the robot independantely of the robot configuration $\theta_2^*$, we want to choose the link lengths $l_1$, and $l_2$ such that:

a) $w_2(\theta_2^*) \leq w_1(\theta_2^*)$ independantly of the robot configuration $\theta_2^*$ b)

$$k(\theta_2^*) = \frac{|l_2 s_2^*|}{\sqrt{l_2^2 + l_1^2 c_2^{2*}}}$$

is maximized independently of the robot configuration $\theta_2^*$

To satisfy condition a) the lengths ratio $l_2/l_1$ must satisfy the condition $l_2/l_1 \geq 1$. To satisfy condition b) the lengths ratio must satisfy $l_2/l_1 = 1$. Hence, the condition $l_2/l_1 = 1$ is the answer to the above kinematic design problem. This means that if the link lengths are equal, the performance of the controlled robot is increased independentely of the robot configuration.

Robot Dynamic Design

The same reasoning as the one held with robot kinematic design can be held with robot dynamic design. But this time the analysis of the diagonal values given by the symbolic MMD of the matrix $\bar{M}(\theta)$, as defined below, is considered. If the matrix $M(\theta)$, as defined in the section planning trajectories, is the matrix product of the jacobian matrix $J(\theta)$ by the inverse of inertia matrix $D^{-1}(\theta)$, and if the robot canonical jacobian $\bar{J}(\theta)$, as defined above, is $J(\theta) = \bar{J}(\theta)N$, then the canonical inertia matrix $\bar{D}(\theta)$ is defined as $D(\theta) = \bar{D}(\theta)N$, and the matrix $\bar{M}(\theta)$ is defined as the product $\bar{J}(\theta)\bar{D}^{-1}(\theta)$. It may be noticed that $J(\theta)D^{-1}(\theta) = \bar{J}(\theta)\bar{D}^{-1}(\theta)$. Again for illustration let's take the two-link robot as an example, and let $w_1^*(\theta_2^*, m_1, m_2, l_1, l_2, I_1, I_2)$ and $w_2^*(\theta_2^*, m_1, m_2, I_1, I_2)$, be the MMD diagonal values given by the symbolic MMD of the matrix $\bar{M}(\theta)$, as defined above; where, $m_1$, $m_2$ are the link weights, $I_1$, $I_2$ are the individual moment of inertia of the links through the individual center of mass, and $l_1$, $l_2$ are the link lengths. The dynamic design problem is resolved to find the parameters $m_1$, $m_2$, $l_1$, $l_2$, $I_1$, $I_2$, which maximize the function $$k(\theta_2^*) = \frac{w_2^*}{w_1^*}$$

for a certain nominal joint value $\theta_2^*$ which characterizes the task in hand.

OTHER EMBODIMENTS WITHIN OTHER FIELDS

While the Megherbi Matrix Decomposition algorithm and computer method have a very useful role in solving finite dimensional indetermined linear systems, their full power is realized in the obtention of a regularization procedure for analysis of certain ill conditioned problems which occur in areas, for example, as bifurcation theory (fluid mechanics fields), Multivariable linear systems and control theory (where the matrix transfer function depends of a Laplace operator), Robotics (preferred embodiment of this invention, where the robot matrix jacobian depends on the robot joint configuration), or any other field or application which is charaterized by solving a linear system $A(\theta)x = y$; where $A(\theta)$ is an $m \times n$ matrix, $\theta$ is a vector or a scalar parameter, y is an $m \times 1$ vector, and x is an $n \times 1$ vector; where normally, the matrix $A(\theta)$ is of full rank, however, for certain critical values of the parameter $\theta$, this rank drops down with one unit or more, depending on the problem at hand. In this case, special computational action must be taken, and the principles of this invention are suitable for solving efficiently and analysing this sort of problems.

I claim:

1. A method for controlling motion of a robot which is capable of moving through and near singularities, given a corresponding robot Jacobian matrix, comprising the method steps:
    symbolically computing a robot Jacobian pseudo-inverse matrix for the robot Jacobian matrix, even when the Jacobian is rank deficient;
    sensing a set of data representative of a current joint configuration of the robot;
    computing a set of MMD (Megherbi Matrix Decomposition) diagonal values from the Jacobian pseudo-inverse matrix, based upon the sensed set of data,
    determining, from the sensed set of data, a minimum allowable MMD diagonal value,
    for each of said MMD diagonal value which is less than the determined minimum MMD diagonal value, substituting zero for the reciprocal of each such value occurring in the robot Jacobian pseudo-inverse matrix, thereby permitting robot motion only in allowable physical directions;
    computing a set of control signals from the robot Jacobian pseudo-inverse matrix for controlling further motion of the robot; and
    moving the robot in response to the set of control signals.

2. The method for controlling motion of a robot according to claim 1, wherein the step of computing the set of control signals from the robot Jacobian pseudo-inverse matrix for controlling further motion of the robot further includes determining a Cartesian speed at which the robot is to be moved at each point of its motion such that a maximum joint velocity physically realizable by the robot is not exceeded.

3. The method for controlling motion of a robot according to claim 1, wherein the step of computing the set of control signals from the robot Jacobian pseudo-inverse matrix for controlling further motion of the robot further includes determining a maximum Cartesian speed at which the robot is to be moved for a given constant robot joint velocity.

4. The method for controlling motion of a robot according to claim 1, wherein the step of computing the set of control signals from the robot Jacobian pseudo-inverse matrix for controlling further motion of the robot further includes determining a maximum Cartesian acceleration at which the robot is to be moved at each point of its motion such that a maximum joint actuator torque limit is not exceeded.

5. The method for controlling motion of a robot according to claim 1, wherein the step of computing the set of control signals from the robot Jacobian pseudo-inverse matrix for controlling further motion of the robot further includes damping and reducing robot joint velocities such that maximum joint velocities physically realizable by the robot are not exceeded, without decreasing a rate of convergence of the method of controlling robot motion near singularities.

6. The method for controlling motion of a robot according to claim 1, wherein the step of computing the set of control signals from the robot Jacobian pseudo-inverse matrix for controlling further motion of the robot further includes damping and reducing robot joint velocities such that maximum joint actuator torque limits are not exceeded, without decreasing a rate of convergence of the method of controlling robot motion near singularities.

7. A robot which is capable of moving through and near singularities, given a corresponding robot Jacobian matrix, comprising:
    sensing means for sensing a set of data representative of a current joint configuration of the robot;
    processing means for providing a set of control signals for controlling motion of the robot comprising:
        memory means for storing a symbolically computed robot Jacobian pseud-inverse matrix for the robot Jacobian matrix, even when the Jacobian is rank deficient;
        computing means responsive to the sensing means and memory means for computing a set of MMD (Megherbi Matrix Decomposition) diagonal values from the Jacobian pseudo-inverse matrix;
        determining means responsive to the sensing means for determining a minimum allowable MMD diagonal value;
        substituting means for substituting zero for the reciprocal of each of said MMD diagonal value occurring in the robot Jacobian pseudo-inverse matrix which is less than the determined minimum MMD diagonal value, thereby permitting robot motion only in allowable physical directions; and
        control means for computing the set of control signals from the robot Jacobian pseudo-inverse matrix; and
    means for moving the robot in response to the set of control signals.

8. A robot according to claim 7, wherein the control means further comprises means for determining a Cartesian speed at which the robot is to be moved at each point of its motion such that a maximum joint velocity physically realizable by the robot is not exceeded.

9. A robot according to claim 7, wherein the control means further comprises means for determining a maximum Cartesian speed at which the robot is to be moved for a given constant robot joint velocity.

10. A robot according to claim 7, wherein the control means further comprises means for determining a maximum Cartesian acceleration at which the robot is to be moved at each point of its motion such that a maximum joint actuator torque limit is not exceeded.

11. A robot according to claim 7, wherein the processing means further comprises means for damping and reducing robot joint velocities such that maximum joint velocities physically realizable by the robot are not exceeded, without decreasing a rate of convergence of the processing means for providing the set of control signals for controlling motion of the robot near singularities.

12. A robot according to claim 7, wherein the processing means further comprises means for damping and reducing robot joint velocities such that maximum joint actuator torque limits are not exceeded, without decreasing a rate of convergence of the processing means for providing the set of control signals for controlling motion of the robot near singularities.

* * * * *